United States Patent
You et al.

(10) Patent No.: US 9,681,404 B2
(45) Date of Patent: Jun. 13, 2017

(54) METHOD AND USER EQUIPMENT FOR SYNCHRONIZING COMPONENT CARRIERS USED IN CARRIER AGGREGATION

(71) Applicant: LG ELECTRONICS INC., Seoul (KR)

(72) Inventors: Hyangsun You, Anyang-si (KR); Yunjung Yi, Anyang-si (KR); Joonkui Ahn, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 206 days.

(21) Appl. No.: 14/411,563

(22) PCT Filed: Jul. 5, 2013

(86) PCT No.: PCT/KR2013/005991
§ 371 (c)(1),
(2) Date: Dec. 29, 2014

(87) PCT Pub. No.: WO2014/007573
PCT Pub. Date: Jan. 9, 2014

(65) Prior Publication Data
US 2015/0208372 A1  Jul. 23, 2015

Related U.S. Application Data

(60) Provisional application No. 61/668,429, filed on Jul. 5, 2012.

(51) Int. Cl.
*H04J 3/06* (2006.01)
*H04W 56/00* (2009.01)
*H04J 11/00* (2006.01)

(52) U.S. Cl.
CPC ..... *H04W 56/0005* (2013.01); *H04J 11/0069* (2013.01); *H04W 56/0035* (2013.01)

(58) Field of Classification Search
CPC .................................................. H04J 11/0069
(Continued)

(56) References Cited

U.S. PATENT DOCUMENTS

| | | | |
|---|---|---|---|
| 2007/0149206 A1* | 6/2007 | Wang | H04W 36/0077 455/450 |
| 2010/0091744 A1 | 4/2010 | Ruohonen et al. | |
| 2011/0103350 A1* | 5/2011 | Lindoff | H04W 36/0094 370/332 |

FOREIGN PATENT DOCUMENTS

| | | |
|---|---|---|
| KR | 10-2010-0052508 | 5/2010 |
| KR | 10-2011-0030372 | 3/2011 |

(Continued)

OTHER PUBLICATIONS

PCT International Application No. PCT/KR2013/005991, Written Opinion of the International Searching Authority dated Oct. 21, 2013, 16 pages.

*Primary Examiner* — Shripal Khajuria
(74) *Attorney, Agent, or Firm* — Lee Hong Degerman Kang & Waimey

(57) ABSTRACT

According to the present invention, user equipment synchronizes a specific component carrier with an NCT-type component carrier with respect to time and/or frequency. The cell synchronization method for synchronizing predetermined cells by user equipment according to the present invention may include receiving reference cell information relating to a first synchronization reference cell for the predetermined cells, acquiring first synchronization information from the first synchronization cell based on the
(Continued)

reference cell information, and performing the synchronization of the predetermined cells based on the first synchronization information.

6 Claims, 13 Drawing Sheets

(58) Field of Classification Search
USPC .......................................................... 370/350
See application file for complete search history.

(56) References Cited

FOREIGN PATENT DOCUMENTS

| KR | 10-2011-0064129 | 6/2011 |
|----|-----------------|--------|
| WO | 2012/074305 | 6/2012 |

* cited by examiner

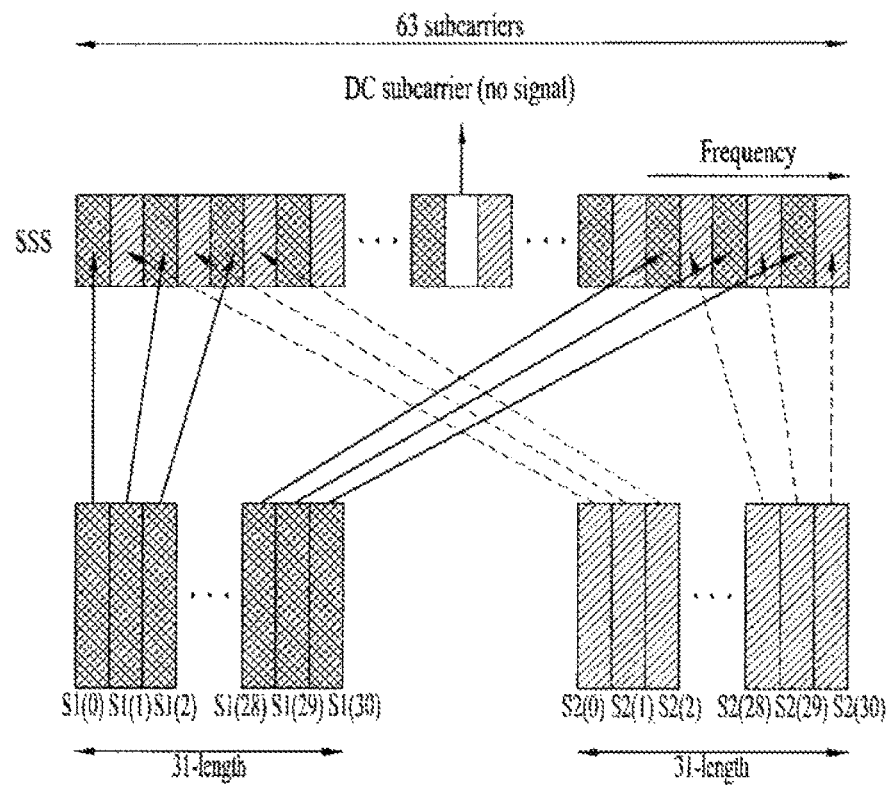
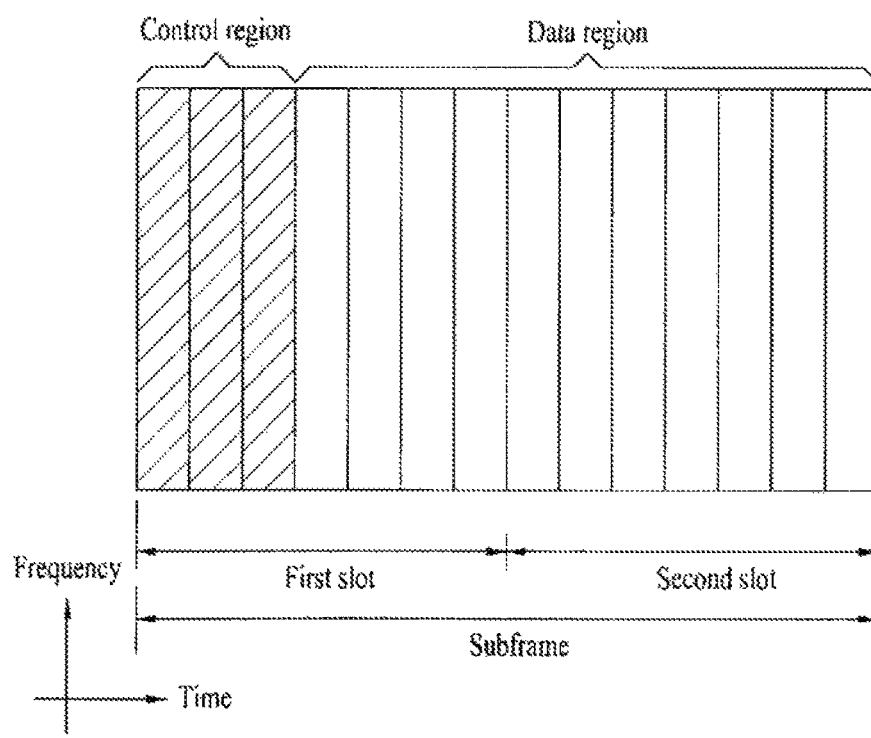

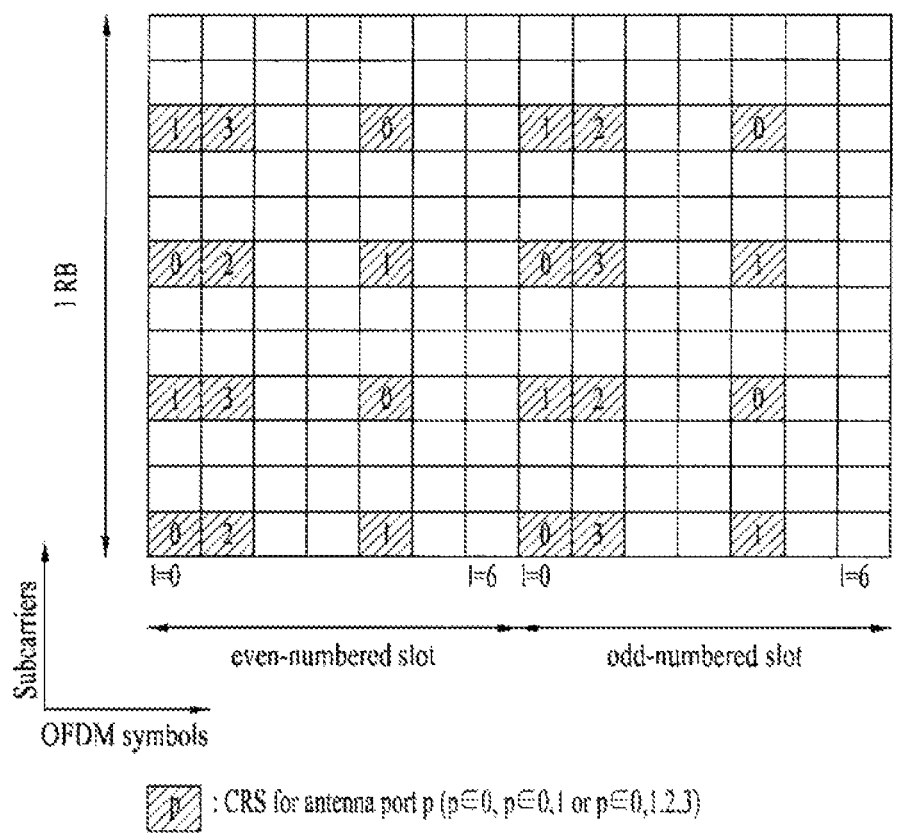

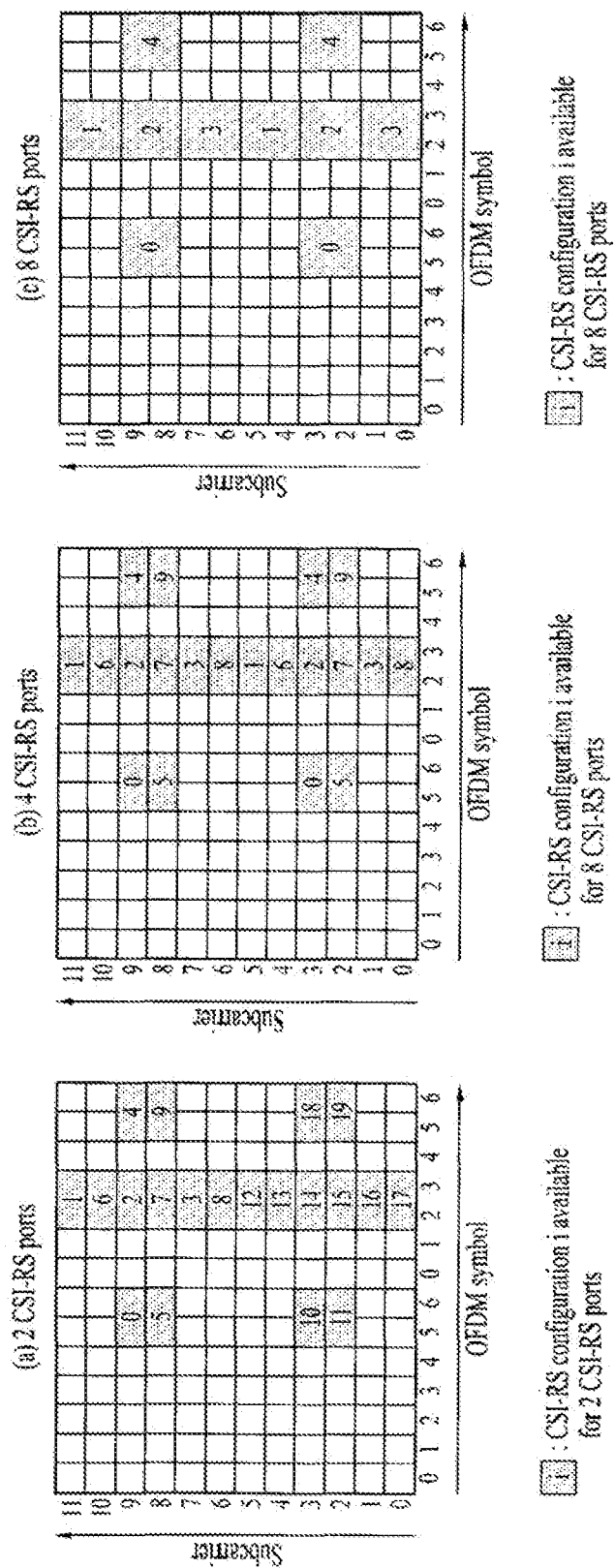

METHOD AND USER EQUIPMENT FOR SYNCHRONIZING COMPONENT CARRIERS USED IN CARRIER AGGREGATION

CROSS-REFERENCE TO RELATED APPLICATIONS

This application is the National Stage filing under 35 U.S.C. 371 of International Application No. PCT/KR2013/005991, filed on Jul. 5, 2013, which claims the benefit of U.S. Provisional Application Ser. No. 61/668,429, filed on Jul. 5, 2012, the contents of which are hereby incorporated by reference herein in their entirety.

TECHNICAL FIELD

The present invention relates to a wireless communication system, and more particularly, to a method of synchronizing component carriers used for carrier aggregation and user equipment therefor.

BACKGROUND ART

A user equipment (UE) in a wireless communication system is able to receive data and/or various control informations in downlink (DL) from a base station (BS) and is also able to transmit data and/or various informations in uplink (UL). In order for a UE to communicate with a BS, the UE should be synchronized with the BS. To this end, if a turned-off power of the UE is turned on again or the UE newly enters a cell corresponding to a geographical region serviced by the BS, the UE performs an initial cell search accompanied with a job such as matching a synchronization with the BS or the like. Having finished the initial cell search, the UE is able to receive data and/or control information through a physical downlink channel and is also able to transmit data and/or control information through a physical uplink channel.

Due to various reasons such as a cell search, a maintenance of time synchronization after synchronization between UE and BS, a correction of frequency offset and the like, a wireless communication system discussed so far defines that various mandatory signals should be transmitted/received on designated radio resources.

Types and amounts of the mandatory signals have increased owing to the developments of standards of the corresponding wireless communication system. Since it is unable to assign a different signal to a radio resource to which a corresponding mandatory signal is assigned, mandatory signals increasing owing to the development of the corresponding wireless communication system hinder the degree of freedom in the scheduling of the corresponding wireless communication system and impose restrictions of the introduction of an efficient communication technology into the corresponding wireless communication system.

DISCLOSURE OF THE INVENTION

Technical Task

Recently, a method of configuring a new carrier free from restrictions imposed on the previously defined mandatory signals is taken into consideration. And, the demand for a method and/or device for configuring or recognizing the new carrier by maintaining compatibility with a device configured in accordance with an existing system is rising.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of synchronizing a prescribed cell in a user equipment, including the steps of receiving a reference cell information on a $1^{st}$ synchronization reference cell for the prescribed cell, obtaining a $1^{st}$ synchronization information from the $1^{st}$ synchronization reference cell based on the reference cell information, and performing a synchronization of the prescribed cell based on the $1^{st}$ synchronization information.

In another technical aspect of the present invention, provided herein is a user equipment in performing a synchronization of a prescribed cell, including an RF (radio frequency) unit and a processor configured to control the RF unit, the processor controlling the RF unit to receive a reference cell information on a $1^{st}$ synchronization reference cell for the prescribed cell, the processor controlling the RF unit to obtain a $1^{st}$ synchronization information from the $1^{st}$ synchronization reference cell based on the reference cell information, the processor performing a synchronization of the prescribed cell based on the $1^{st}$ synchronization information.

In the respective aspects of the present invention, the reference cell information may include at least one of a center frequency, a bandwidth, a cell-ID, a CSI-RS configuration, a CRS (Common Reference Signal) transmission period, a CRS transmission bandwidth, a CRS subframe location, a PSS/SSS (Primary Synchronization Signal/Secondary Synchronization Signal) transmission period, an MBSFN (Multicast broadcast single frequency network) subframe location of the $1^{st}$ synchronization reference cell.

In the respective aspects of the present invention, performing a measurement for a radio resource management (RRM) of the prescribed cell based on a reference signal for the $1^{st}$ synchronization reference cell may be further included and the reference signal for the $1^{st}$ synchronization reference signal may include one of a CSI-RS (Channel State Information Reference Signal), a CRS (Common Reference Signal) and a tracking RS (Reference Signal).

In the respective aspects of the present invention, obtaining a $2^{nd}$ synchronization information for the synchronization of the prescribed cell from a $2^{nd}$ synchronization reference cell may be further included and the synchronization of the prescribed cell may be performed based on an average value of the $1^{st}$ synchronization information and the $2^{nd}$ synchronization information.

In the respective aspects of the present invention, obtaining a $2^{nd}$ synchronization information for the synchronization of the prescribed cell from a $2^{nd}$ synchronization reference cell and measuring a channel state of each of the $1^{st}$ synchronization reference cell and the $2^{nd}$ synchronization reference cell may be further included and the synchronization of the prescribed cell may be performed based on a synchronization information of a cell having a value of the measured channel state equal to or greater than a prescribed value in the $1^{st}$ synchronization reference cell and the $2^{nd}$ synchronization reference cell.

Technical tasks obtainable from the present invention are non-limited by the above-mentioned technical tasks. And, other unmentioned technical tasks can be clearly understood from the following description by those having ordinary skill in the technical field to which the present invention pertains.

Advantageous Effects

According to the present invention, it is able to configure a new carrier free from mandatory signals of an existing system by maintaining compatibility with the existing system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 4 is a diagram to describe a generation method of a secondary synchronization signal (SSS).

FIG. 5 is a diagram for one example of a downlink subframe used for a wireless communication system.

FIG. 6 is a diagram for one example of a configuration of a cell specific common reference signal.

FIG. 7 is a diagram for one example of CSI-RS (channel state information reference signal) configurations.

BEST MODE FOR INVENTION

Figure 1:
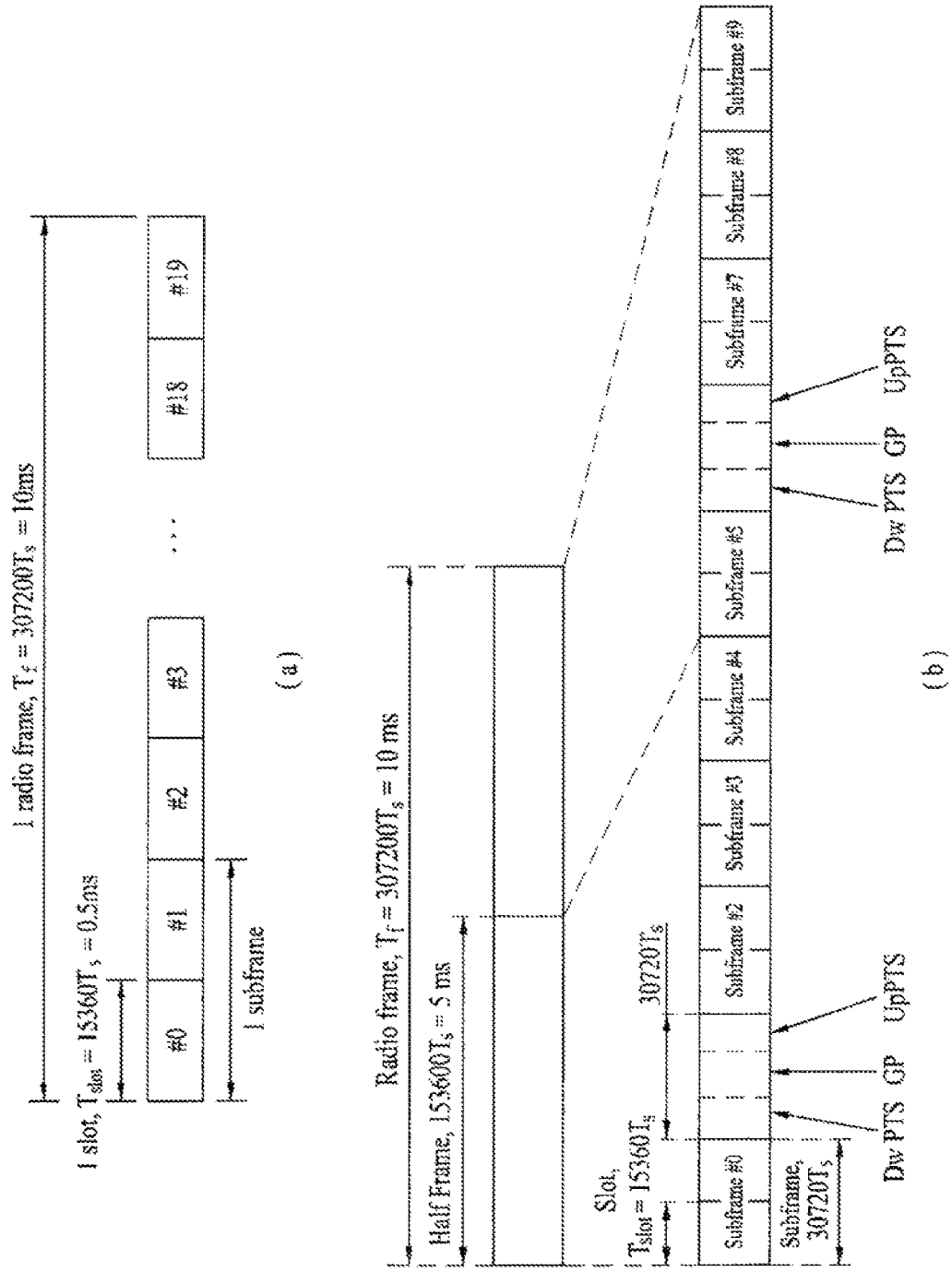
FIG. 1 is a diagram for one example of a radio frame structure used for a wireless communication system.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Although the following descriptions are made in detail on the assumption that a mobile communication system includes 3GPP ($3^{rd}$ generation partnership project) LTE (long term evolution) or 3GPP LTE-A (LTE-Advanced) system for clarity, they are applicable to other wireless communication systems as well as to LTE/LTE-A system.

In the following description, the detailed embodiments of the present invention are explained in a manner that a carrier configured by the existing wireless communication standard is named a legacy carrier type (LCT) carrier, an LCT component carrier (CC), an LCT cell or a normal carrier and that a carrier configured under the restrictions relatively smaller than those of the LCT carrier is named a new carrier type (NCT) carrier, an NCT CC, an NCT cell or an extended carrier.

According to the present invention, a user equipment (UE) can be fixed or have mobility. And, the UE include one of various devices capable of transceiving user data and/or various control informations by communicating with a base station (BS). The UE can be called one of Terminal Equipment, MS (Mobile Station), MT (Mobile Terminal), UT (User Terminal), SS (Subscribe Station), wireless device, PDA (Personal Digital Assistant), wireless modem, handheld device and the like. Moreover, according to the present invention, a BS means a fixed station communicating with a UE and/or other BS in general and exchanges various data and/or control informations by communicating with UE or other BS. The BS may be called a different terminology such as ABS (Advanced Base Station), NB (Node-B), eNB (evolved-NodeB), BTS (Base Transceiver System), Access Point, PS (Processing Server or the like. In the following description of the present invention, BS shall be commonly called eNB.

According to the present invention, a node means a fixed point capable of transmitting/receiving a wireless signal by communicating with a UE. Various types of eNBs may be usable as nodes irrespective of their names. For instance, a node may include one of BS, NB, eNB, Pico-cell eNB (PeNB), Home eNB (HeNB), relay, repeater and the like. Moreover, the node may not include an eNB. For instance, the node may include one of a radio remote head (RRH), a radio remote unit (RRU) and the like. Each of the RRH, the RRU and the like has a power level lower than that of an eNB in general. Since RRH or RRU (hereinafter named RRH/RRU) is normally connected to an eNB through a dedicated line such as an optical cable or the like, a cooperative communication between RRH/RRU and eNB can be performed more smoothly than a cooperative communication between eNBs connected to each other through a wireless line. At least one antenna is installed at a node. In this case, the antenna may mean a physical antenna. And, the antenna may mean an antenna port, a virtual antenna or an antenna group. Moreover, the node may be called a point.

According to the present invention, a cell means a predetermined geographical area in which at least one node provides a communication service. Hence, according to the present invention, a communication with a specific cell may mean a communication with an eNB or node that provides a communication service to the specific cell. Moreover, a DL/UL signal of a specific cell means a DL/UL signal from/to an eNB or node that provides a communication service to the specific cell. Particularly, a cell capable of providing a UL/DL communication service to a UE is called a serving cell. And, a channel state/quality of a specific cell means a channel state/quality of a channel or communication link established between an eNB or node providing a communication service to the specific cell and a UE. In LTE/LTE-A based system, a UE can measure a downlink channel state from a specific node using CRS(s) carried on CRS (cell-specific reference signal) resource allocated to the specific node and/or CSI-RS(s) carried on CSI-RS (channel state information reference signal) resource. Meanwhile, 3GPP LTE/LTE-A system uses a concept of a cell to manage a radio resource. A cell associated with a radio resource is distinguished from a cell of a geographical area. A cell associated with a radio resource shall be described in detail with reference to FIG. 10 and FIG. 11 later.

The 3GPP LTE/LTE-A standard defines downlink physical channels corresponding to resource elements for carrying information originating from an upper layer and downlink physical signals corresponding to resource elements for not carrying information originating from an upper layer despite being used by a physical layer. For instance, a physical downlink shared channel (PDSCH), a physical broadcast channel (PBCH), a physical multicast channel (PMCH), a physical control format indicator channel (PCFICH), a physical downlink control channel (PDCCH) and a physical hybrid ARQ indicator channel (PHICH) are defined as downlink physical channels. And, a reference signal and a synchronization signal are defined as downlink physical signals. A reference signal named a pilot means a signal of a predefined special waveform known to both a BS and a UE. For instance, a cell specific RS, a UE-specific RS, a positioning RS (PRS) and a channel state information RS (CSI-RS) are defined as downlink reference signals. The 3GPP LTE/LTE-A standard defines uplink physical channels corresponding to resource elements for carrying information originating from an upper layer and uplink physical signals corresponding to resource elements for not carrying information originating from an upper layer despite being used by a physical layer. For instance, a physical uplink shared channel (PUSCH), a physical uplink control channel (PUCCH) and a physical random access channel (PRACH) are defined as uplink physical channels. And, a demodulation reference signal (DM RS) for an uplink control/data signal and a sounding reference signal (SRS) used for an uplink channel measurement are defined as uplink physical signals.

According to the present invention, PDCCH (Physical Downlink Control CHannel)/PCFICH (Physical Control Format Indicator CHannel)/PHICH (Physical Hybrid automatic retransmit request Indicator CHannel)/PDSCH (Physical Downlink Shared CHannel) mean a set of time-frequency resources or a set of resource elements for carrying DCI (Downlink Control Information)/CFI (Control Format Indicator)/DL ACK/NACK (ACKnowledgement/ Negative ACK)/DL data. Moreover, PUCCH (Physical Uplink Control CHannel)/PUSCH (Physical Uplink Shared CHannel)/PRACH (Physical Random Access CHannel) means a set of time-frequency resources or a set of resource elements for carrying UCI (Uplink Control Information)/UL data/random access signal. Particularly, according to the present invention, each time-frequency resource or resource element (RE) assigned or belonging to PDCCH/PCFICH/ PHICH/PDSCH/PUCCH/PUSCH/PRACH shall be named PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, an expression 'UE transmits PUCCH/PUSCH/PRACH' is used as the same meaning as transmitting UL control information/ UL data/random access signal on or through PUSCH/ PUCCH/PRACH. Moreover, an expression 'eNB transmits PDCCH/PCFICH/PHICH/PDSCH' is used as the same meaning as transmitting DL data/control information on or through PDCCH/PCFICH/PHICH/PDSCH.

In the following description, CRS/DMRS/CSI-RS/SRS/ UE-specific RS assigned or configured OFDM symbol/ subcarrier/RE shall be named CRS/DMRS/CSI-RS/SRS/ UE-specific RS symbol/carrier/subcarrier/RE. For instance, CRS assigned or configured OFDM symbols is named CRS symbol, CRS assigned or configured subcarrier is named CRS subcarrier, and CRS assigned or configured RE is named CRS RE. A subframe configured for CRS transmission is named CRS subframe. A broadcast signal carried subframe is named a broadcast subframe or a PBCH subframe and a subframe, on which a synchronization signal (e.g., PSS and/or SSS) is carried, is named a synchronization signal subframe or a PSS/SSS subframe. PSS/SSS assigned or configured OFDM symbol/subcarrier/RE is named PSS/ SSS symbol/subcarrier/RE.

FIG. 1 is a diagram for one example of a radio frame structure used for a wireless communication system.

Particularly, FIG. 1 (a) shows a frame structure for frequency division duplex (FDD) used for 3GPP LTE/ LTE-A system. And, FIG. 1 (b) shows a frame structure for time division duplex (TDD) used for 3GPP LTE/LTE-A system.

Referring to FIG. 1, a radio frame used for 3GPP LTE/ LTE-A system has a length of 10 ms (307200 Ts) and is configured with 10 subframes (SF) equal to each other in size. Numbers can be assigned to the 10 subframes in a single radio frame. In this case, Ts indicates a sampling time and is expressed as 'Ts=1/(2048*15 kHz)'. Each of the subframes has a length of 1 ms and is configured with 2 slots. 20 slots in a radio frame can be sequentially numbered as 0 to 19, respectively. Each of the slots has a length of 0.5 ms. A time for transmitting a subframe is defined as a transmission time interval (TTI). A time resource can be distinguished by a radio frame number (or a radio frame index), a subframe number (or a subframe index), a slot number (or a slot index) or the like.

A radio frame may be configured different depending on a duplex mode. For instance, in FDD mode, since a DL transmission and an UL transmission are distinguished from each other by frequencies, a radio frame contains either a DL subframe or a UL subframe for a specific frequency band. In TDD mode, since a DL transmission and an UL transmission are distinguished from each other by times, a radio frame contains both a DL subframe and a UL subframe for a specific frequency band.

Table 1 shows DL-UL configuration of subframes in a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D indicates a DL subframe, U indicates a UL subframe, and S indicates a special subframe. The special subframe includes 3 fields of DwPTS (Downlink Pilot TimeSlot), GP (Guard Period) and UpPTS (Uplink Pilot TimeSlot). The DwPTS is a time interval reserved for a DL transmission, while the UpPTS is a time interval reserved for a UL transmission. Table 2 shows one example of a configuration of a special subframe.

TABLE 2

| | | Normal cyclic prefix in downlink | | Extended cyclic prefix in downlink | | |
|---|---|---|---|---|---|---|
| | | | UpPTS | | | UpPTS |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
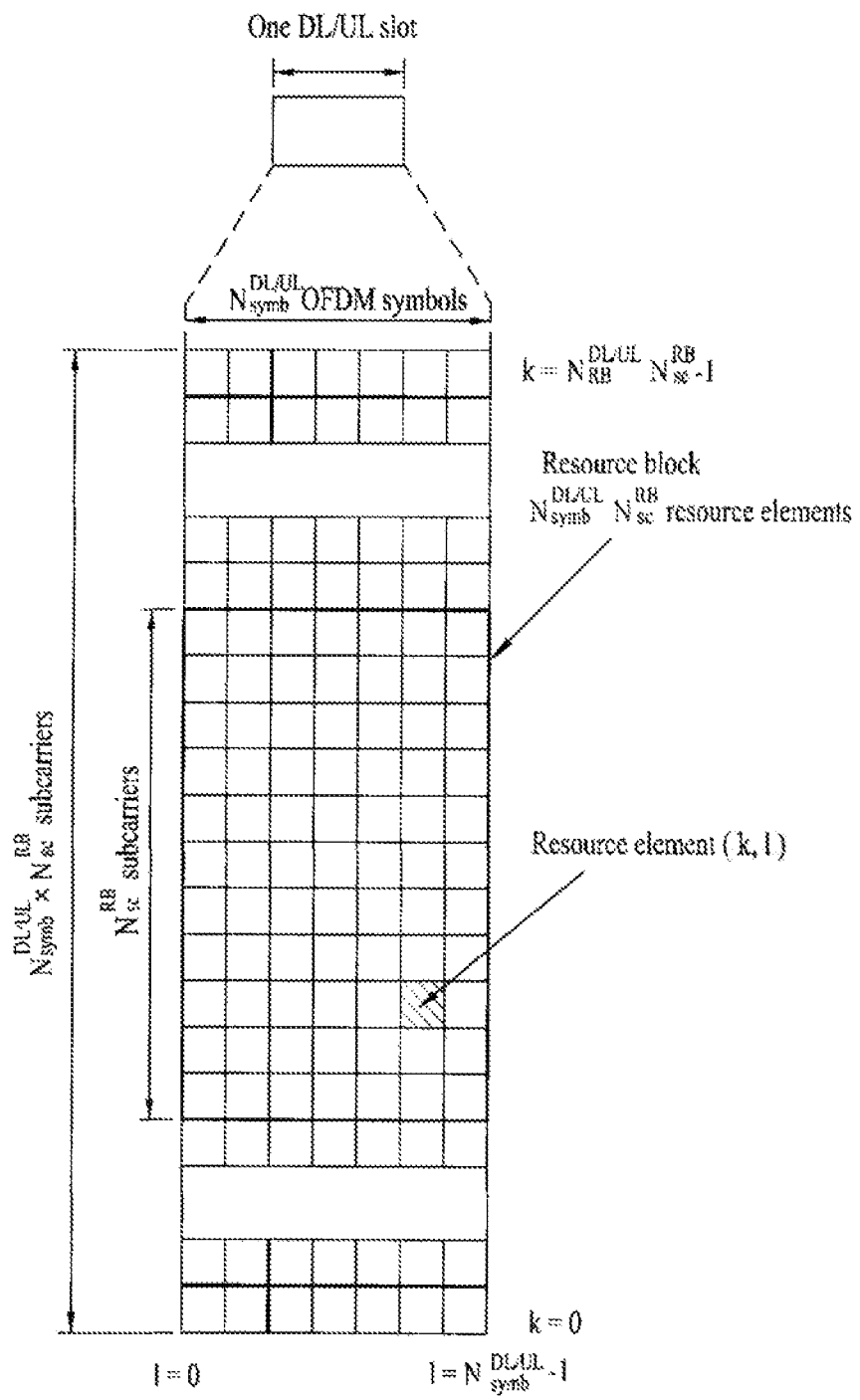
FIG. 2 is a diagram for one example of a downlink/uplink (DL/UL) slot structure in a wireless communication system.

FIG. 2 is a diagram for one example of a downlink/uplink (DL/UL) slot structure in a wireless communication system. Particularly, FIG. 2 shows a structure of a resource grid of 3GPP LTE/LTE-A system.

Referring to FIG. 2, a slot includes a plurality of OFDM (orthogonal frequency division multiplexing) symbols in a time domain and also includes a plurality of resource blocks (RBs) in a frequency domain. An OFDM symbol may mean a single symbol duration (or interval). Referring to FIG. 2, a signal transmitted in each slot may be represented as a resource grid configured with $N^{DL/UL}_{RB} * N^{RB}_{sc}$ subcarriers and $N^{DL/UL}_{symb}$ OFDM symbols. In this case, $N^{DL}_{RB}$ indicates the number of resource blocks (RBs) in a DL slot and $N^{UL}_{RB}$ indicates the number of RBs in a UL slot. $N^{DL}_{RB}$ and $N^{UL}_{RB}$ are dependent on a DL transmission bandwidth and a UL transmission bandwidth, respectively. $N^{UL}_{symb}$ indicates the number of OFDM symbols in the DL slot and $N^{UL}_{symb}$ indicates the number of OFDM symbols in the UL slot. And, $N^{RB}_{sc}$ indicates the number of subcarriers configuring a single RB.

OFDM symbol may be called OFDM symbol, SC-FDM (signal carrier frequency division multiplexing) symbol or the like depending on a multiplexing access type. The number of OFDM symbols included in a single slot is variously changeable depending on a channel bandwidth, a length of CP (cyclic prefix) or the like. For instance, in case of a normal CP, a single slot includes 7 OFDM symbols. Yet, in case of an extended CP, a single slot includes 6 OFDM symbols. For clarity of the description, FIG. 2 shows one example of a subframe having a single slot configured with 7 OFDM symbols. Yet, according to embodiments of the present invention, the same method is applicable to subframes, each of which has the different number of OFDM symbols. Referring to FIG. 2, each OFDM symbol includes $N^{DL/UL}_{RB} * N^{RB}_{sc}$ subcarriers in a frequency domain. A types of subcarrier can be categorized into a data subcarrier for a data transmission, a reference signal subcarrier for a reference signal transmission, or a null subcarrier for a guard band or a DC (direct current) component. The DC component is mapped to a carrier frequency (f0) in an OFDM signal generating process or a frequency upconverting process. The carrier frequency may be called a center frequency (fc).

A single RB is defined as $N^{DL/UL}_{symb}$ (e.g., 7) contiguous OFDM symbols in a time domain and $N^{RB}_{sc}$ (e.g., 12) contiguous subcarriers. For reference, a resource configured with a single OFDM symbol and a single subcarrier is called a resource element (RE) or tone. Hence, a single RB is configured with $N^{DL/UL}_{symb} * N^{RB}_{sc}$ resource elements. Each resource element in a resource lattice can be uniquely defined by an index pair (k, l) in a single slot. In this case, the k is an index assigned from 0 to $N^{DL/UL}_{RB} * N^{RB}_{sc} - 1$ in a frequency domain, and the l is an index assigned from 0 to $N^{UL/DL}_{symb} - 1$ in a time domain.

Meanwhile, a single RB is mapped to each of a single physical resource block (PRB) and a single virtual resource block (VRB). The PRB is defined as $N^{DL/UL}_{symb}$ (e.g., 7) contiguous OFDM or SC-FDM symbols in a time domain and is also defined as $N^{RB}_{sc}$ (e.g., 12) contiguous subcarriers. Hence, a single PRB is configured with $N^{DL/UL}_{symb} \times N^{RB}_{sc}$ resource elements. Two RBs, which occupy $N^{RB}_{sc}$ contiguous equal subcarriers in a single subframe and are located at two slots of the subframe, respectively, is called a PRB pair. The 2 RBs configuring the PRB pair has the same PRB number (or index).

In order for a UE to receive a signal from an eNB or to transmit a signal to the eNB, time/frequency synchronization of the UE should be matched to that of the eNB. Only if the UE is synchronized with the eNB, it is able to determine time and frequency parameters necessary for the UE to perform a demodulation of a DL signal and a transmission of a UL signal at a precise timing.

Figure 3:
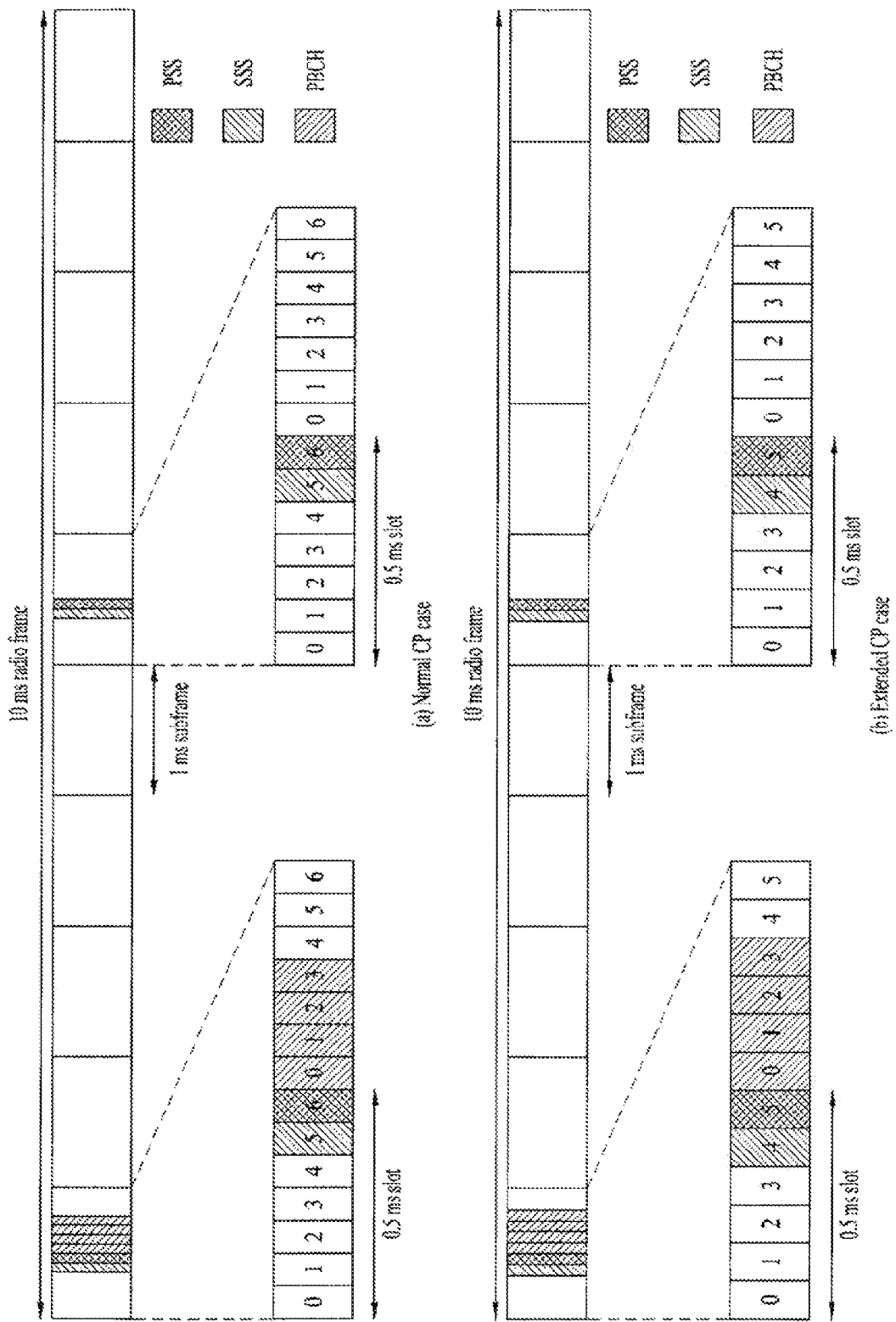
FIG. 3 is a diagram for one example of a radio frame structure for a transmission of a synchronization signal (SS).

FIG. 3 is a diagram for one example of a radio frame structure for a transmission of a synchronization signal (SS).

Particularly, FIG. 3 shows one example of a radio frame structure for the transmissions of synchronization signal and PBCH in frequency division duplex (FDD). FIG. 3 (a) shows transmission positions of SS and PBCH in a radio frame configured as a normal CP (cyclic prefix). FIG. 3 (b) shows transmission positions of SS and PBCH in a radio frame configured as an extended CP.

If a power is turned on or a UE intends to newly access a cell, the UE performs an initial cell search procedure for obtaining time and frequency synchronizations with the cell, detecting a physical cell identity $N^{cell}_{ID}$ and the like. To this end, the UE matches a synchronization with an eNB by receiving synchronization signals (e.g., Primary Synchronization Signal (PSS) and Secondary Synchronization Signal (SSS)) from the eNB and is then able to obtain information such as a cell identity (ID) and the like.

The SS is further described in detail with reference to FIG. 3 as follows. First of all, SS is categorized into PSS and SSS. The PSS is used to obtain time domain synchronization (e.g., OFDM symbol synchronization, slot synchronization, etc.) and/or frequency domain synchronization. And, the SSS is used to obtain frame synchronization, cell group ID and/or CP configuration (i.e., use information of normal or extended CP) of a cell. Referring to FIG. 3, PSS and SSS are transmitted in 2 OFDM symbols of each radio frame, respectively. In particular, SS is transmitted in a $1^{st}$ slot of a subframe 0 and a $1^{st}$ slot of a subframe 5 in consideration of 4.6 ms corresponding to a GSM (global system for mobile communication) frame length to facilitate inter-RAT (inter radio access technology) measurement. In more particular, the PSS is transmitted in a last OFDM symbol of the $1^{st}$ slot of the subframe 0 and a last OFDM symbol of the $1^{st}$ slot of the subframe 5. And, the SSS is transmitted in a $2^{nd}$ last OFDM symbol of the $1^{st}$ slot of the subframe 0 and a $2^{nd}$ last OFDM symbol of the $1^{st}$ slot of the subframe 5. A boundary of the corresponding radio frame can be detected through the SSS. The PSS is transmitted in a last OFDM symbol of a corresponding slot, while the SSS is transmitted in an OFDM symbol right before the PSS. A transmit diversity scheme of SS uses a single antenna port only and is not defined separately in the standard. In particular, a single antenna port transmission or a UE transparent transmission scheme (e.g., PVS (Precoding Vector Switching), TSTD (Time Switched Diversity), CDD (cyclic delay diversity)) can be used for the transmit diversity of SS.

SS can indicate total 504 physical layer cell IDs through combinations of 3 PSSs and 168 SSs. So to speak, the physical layer cell IDs are grouped into 168 physical-layer cell-ID groups, each of which includes 3 unique IDs in order for each physical layer cell ID to only become a part of a single physical-layer cell-ID group. Hence, a physical layer cell ID '$N^{cell}_{ID}=3N^{(1)}_{ID}+N^{(2)}_{ID}$' is uniquely defined by the number $N^{(1)}_{ID}$ indicating a physical-layer cell-ID group in a range between 0 and 167 and the number $N^{(2)}_{ID}$ indicating the physical-layer ID in the corresponding physical-layer cell-ID group in a range between 0 and 2. UE is able to recognize one of 3 unique physical-layer IDs by detecting PSS and is also able to identify one of 168 physical layer cell IDs associated with the physical-layer ID by detecting SSS. ZC (Zadoff-Chu) sequence having a length of 63 is defined in a frequency domain and used as PSS. For instance, ZC sequence can be defined by the following formula.

$$d_u(n) = e^{-j\frac{\pi u n(n+1)}{N_{ZC}}} \quad \text{[Formula 1]}$$

In Formula 1, $N_{ZC}=63$ and 'n=31', which is a sequence element corresponding to a DC subcarrier, is punctured.

PSS is mapped to 6 RBs (=72 subcarriers) close to a center frequency. 9 remaining subcarriers among the 72 subcarriers always carry a value of 0, which works as a factor for facilitating a filter design for performing synchronization. In order to define total 3 PSSs, 'u=24, 29 and 34' is used by Formula 1. Since 'u=24' and 'u=34' have the conjugate symmetry relation in-between, 2 correlations can be simultaneously performed. In this case, the conjugate symmetry means the following formula relation.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is odd number.} \quad \text{[Formula 2]}$$

Using the characteristics of the conjugate symmetry, it is able to implement a one-shot correlator for 'u=29' and 'u=34'. And, an overall operation amount can be reduced by about 33.3% in comparison with the case of no conjugate symmetry.

In particular, a sequence d(n) used for PSS is generated from a frequency domain ZC sequence by the formula as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Formula 3]}$$

In Formula 3, ZC root sequence index u is given by the following table.

TABLE 3

| $N^{(2)}_{ID}$ | Root index u |
|---|---|
| 0 | 25 |
| 1 | 29 |
| 2 | 34 |

Referring to FIG. 3, since PSS is transmitted every 5 ms, the UE is aware that a corresponding subframe is one of the subframe 0 and the subframe 5 by detecting the PSS but is unable to exactly know that the corresponding subframe is the subframe 0 or the subframe 5. Hence, the UE is unable to recognize a boundary of the radio frame with the PSS only. In particular, it is unable to obtain frame synchronization with the PSS only. The UE detects the boundary of the radio frame by detecting the SSS that is transmitted twice in a single radio frame with different sequences.

FIG. 4 is a diagram to describe a generation method of a secondary synchronization signal (SSS). Particularly, FIG. 4 shows a relation in mapping 2 sequences into a physical domain from a logical domain.

A sequence used for SSS is interleaved concatenation of two m-sequences of length '31' and the concatenated sequence is scrambled by a scrambling sequence given by PSS. In this case, the m-sequence is a sort of PN (pseudo noise) sequence.

Referring to FIG. 4, assuming that two m-sequences used for SSS code generation are S1 and S2, respectively, regarding the S1 and the S2, two different PSS based sequences are scrambled to SSS. In this case, the S1 and the S2 are scrambled by different sequences, respectively. The PSS based scrambling code can be obtained from performing a circular shift of the m-sequence generated from a polynomial '$x^5+x^3+1$', and 6 sequences are generated by the circular shift of the m-sequence in accordance with PSS index. Thereafter, the S2 is scrambled by the S1 based scrambling code. The S1 based scrambling code can be obtained from a circular shift performed on the m-sequence generated from a polynomial '$x^5+x^4+x^2+x^1+1$' and 8 sequences are generated by the circular shift of the m-sequence in accordance with an index of the S1. Although the code of the SSS is swapped every 5 ms, the PSS based scrambling code is not swapped. For instance, assuming that an SSS of a subframe 0 carries a cell group ID by a combination of (S1, S2), an SSS of a subframe 5 carries a sequence sw3apped with (S2, S1). Through this, it is able to distinguish a radio frame boundary of 10 ms. In doing so, the SS code used for this is generated from a polynomial of '$x^5+x^2+1$', and total 31 codes can be generated from different circular shifts of m-sequence having a length 31.

The combination of the two m-sequences of the length 31, which defines the SSS, differs in each of the subframe 0 and the subframe 5. In accordance with the combinations of the two m-sequences of the length 31, total 168 cell group IDs are expressed. The m-sequence sued as a sequence of the SSS is characterized in being robust in a frequency-selective environment. Since the m-sequence can be transformed by Fast m-Sequence transform using the fast Hadamard transform, it the m-sequence is utilized as SSS, it is able to reduce an operation amount required for a UE to interpret the SSS. Moreover, as the SSS is configured with two short codes, an operation amount of the UE can be reduced.

Having determined the time and frequency parameters necessary to perform the demodulation of the DL signal and the transmission of the UL signal at the precise timing by performing the cell search procedure using the SSS, the UE can communicate with the eNB only if obtaining system information required for the system configuration of the UE from the eNB.

The system information is configured with Master Information Block (MIB) and System Information Blocks (SIBs). Each of the system information blocks includes a collection of functionally associated parameters and can be categorized into Master Information Block (MIB), System Information Block Type 1 (SIB1), System Information Block Type 2 (SIB2) and SIB3~SIB8 in accordance with the included parameter. The MIB includes most frequently transmitted parameters mandatory for a UE to make an initial access to a network of an eNB. The SIB1 includes parameters required for determining whether a specific cell is a cell appropriate for a cell selection as well as information of time domain scheduling of other SIBs.

A UE can receive an MIB through a broadcast channel (e.g., PBCH). In the MIB, dl-Bandwidth (DL BW), PHICH configuration and system frame number (SFN) are included. Hence, the UE can be explicitly aware of information on the DL BW, SFN and PHICH configuration by receiving the PBCH. Meanwhile, the information the UE can be aware of implicitly through the reception of the PBCH may include the number of transmitting antenna ports of an eNB. The information on the number of the transmitting antennas of the eNB is implicitly signaled in a manner of masking 16-bit CRC (Cyclic Redundancy Check) with a sequence corresponding to the transmitting antenna number.

The PBCH is mapped to 4 subframes in 40 ms. The time of 40 ms is blind-detected. And, explicit signaling for the time of 40 ms does not exist separately. In a time domain, PBCH is transmitted in OFDM symbols 0 to 3 of a slit 1 ($2^{nd}$ slot of subframe 0) within a subframe 0 of a radio frame.

In a frequency domain, PSS/SSS and PBCH are transmitted on total 6 RBs, which are located in a manner that 3 RBs and 3 RBs are located on the right and left sides centering on a DC subcarrier in a corresponding OFDM symbol, respectively, i.e., within total 72 subcarriers only irrespective of a real system bandwidth. Hence, a UE is configured to detect or decode SS and PBCH irrespective of a DL transmission bandwidth configured for the UE.

Having accessed the network of the eNB after finishing the initial cell search, the UE is able to further detailed system information by receiving PDCCH and PDSCH in accordance with the information carried on the PDCCH. Having performed the above-described procedure, the UE can perform PDCCH/PDSCH reception and PUSCH/PUCCH transmission as a general UL/DL signal transmitting procedure.

FIG. 5 is a diagram for one example of a downlink subframe used for a wireless communication system.

Referring to FIG. 5, a DL subframe is divided into a control region and a data region in a time domain. Referring to FIG. 5, maximum 3 (or 4) OFDM symbols located in a head part of a $1^{st}$ slot of a subframe correspond to a control region to which a control channel is assigned. In the following description, a resource region available for PDCCH transmission in a DL subframe shall be named a PDCCH region. The rest of OFDM symbols except the OFDM symbol(s) used as the control region correspond to a data region to which PDSCH (Physical Downlink Shared CHannel) is assigned. In the following description, a resource region available for PDSCH transmission in a DL subframe shall be named a PDSCH region. Examples of a DL control channel used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted in a $1^{st}$ OFDM symbol of a subframe and carries information on the number of OFDM symbol(s) used for a transmission of a control channel in the subframe. The PHICH carries HARQ (Hybrid Automatic Repeat Request) ACK/NACK (acknowledgment/negative-acknowledgment) signal in response to a UL transmission.

Control information transmitted on PDCCH is named downlink control information (DCI). The DCI includes resource allocation information for a UE or a UE group and other control informations. Transmit format and resource allocation information of a downlink shared channel (DL-SCH) is called a DL scheduling information or a DL grant. And, transmit format and resource allocation information of an uplink shared channel (UL-SCH) is called a UL scheduling information or a UL grant. DCI carried on a single PDCCH differs in size and usage in accordance with a DCI format and its size may vary in accordance with a coding rate.

A plurality of PDCCHs can be transmitted within a control region. A UE can monitor a plurality of the PDCCHs. A BS determines a DCI format in accordance with a DCI which is to be transmitted to the UE and then attaches a CRC (cyclic redundancy check) to the DCI. The CRC is masked (or scrambled) with an identifier (e.g., RNTI (radio network temporary identifier)) in accordance with an owner or use purpose of PDCCH. For instance, if PDCCH is provided for a specific UE, CRC can be masked with an identifier (e.g., cell-RNTI (C-RNTI)) of the corresponding UE. If PDCCH is provided for a paging message, CRC can be masked with a paging identifier (e.g., paging-RNTI (P-RNTI)). If PDCCH is provided for system information (particularly, system information block (SIB)), CRC can be masked with SI-RNTI (system information RNTI). If PDCCH is provided for a random access response, CRC can be masked with RA-RNTI (random access-RNTI). CRC masking (or scrambling) includes an operation of performing XOR operation on CRC and RNTI on a bit level.

Reference signals (RSs) can be classified into RS for demodulation and RS for channel measurement in accordance with roles of the RSs. Currently, cell-specific RS is used for both of the demodulation and the channel measurement, UE-specific RS is used for the demodulation, and CSI-RS is used for derivation of channel state information. Meanwhile, RSs are classified into a dedicated RS (DRS) and a common RS (CRS) in accordance with recognitions of an existence of RS. The DRS is known to a specific UE only, while the CRS is known to all UEs. The cell-specific RS among the RSs currently defined in 3GPP LTE/LTE-A may be regarded as a sort of CRS. And, the UE-specific RS may be regarded as a sort of DRS.

FIG. 6 is a diagram for one example of a configuration of a cell specific common reference signal. Particularly, FIG. 6 shows a CRS structure for 3GPP LTE system supportive of maximum 4 antennas.

$$k = 6m + (v + v_{shift}) \bmod 6 \quad \text{[Formula 4]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In this case, the k indicates a subcarrier index, the l indicates an OFDM symbol index, the p indicates an antenna port number, the $N^{max,DL}_{RB}$ indicates a greatest DL bandwidth configuration expressed as an integer multiple of $N^{RB}_{sc}$.

Variables v and $v_{shift}$ define locations in a frequency domain for different RSs, respectively. And, the v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Formula 5]}$$

In this case, the $n_s$ is a slot number in a radio frame. And, a cell-specific frequency shift is given as follows.

$$v_{shift} = N_{ID}^{cell} \bmod 6 \quad \text{[Formula 6]}$$

Referring to FIG. 6, Formula 4 and Formula 5, the current 3GPP LTE/LTE-A standard requests that a cell-specific CRS used for demodulation and channel measurement among various RSs defined for a corresponding system needs to be transmitted across overall DL band of carrier in all DL subframes. Moreover, since the cell-specific CRS is used for demodulation of a DL data signal in 3GPP LTE/LTE-A system, it is transmitted each time through all antenna ports for DL transmission.

Meanwhile, the cell-specific CRS is used for a tracking, in which a UE obtains time and frequency synchronizations of a carrier used by an eNB for a communication with the UE and then correcting a frequency offset by maintaining the time synchronization, as well as for the channel state measurement and the data demodulation.

A measurement of DL and a reporting of the measured DL are described in detail as follows.

First of all, in order for a base station to support a handover operation of a user equipment (UE), an inter-cell interference coordination and the like, it is necessary for the user equipment to perform a DL measurement and to report a result of the DL measurement to the base station. In the DL measurement, various measurement schemes (e.g., a measurement for RLM (Radio Link Monitoring), a measurement for a Channel State Information (CSI) reporting, an RRM (Radio Resource Management) measurement, etc.) and various measurement values exist.

For instance, the RLM measurement may include a DL measurement used for a process for detecting a Radio Link Failure (RLF) and discovering a new radio link. The measurement for the CSI reporting may include a measurement for a UE to select/calculate and report an appropriate rank indicator, an appropriate precoding matrix indicator and an appropriate channel quality indicator by measuring a quality of a DL channel. For instance, the RRM measurement may include a measurement for determining a presence or non-presence of a handover of a user equipment.

The RRM measurement may include measurements of Reference Signal Received Power (RSRP), Reference Signal Received Quality (RSRQ), Received Signal Strength Indicator (RSSI) and the like.

RSRP is defined as a linear average of power of a resource element that carries a cell-specific RS (CRS) in a measured frequency bandwidth. A user equipment can determine RSRP by detecting a cell-specific RS transmitted in a manner of being mapped onto a specific resource element. For RSRP calculation, a cell-specific RS (R0) for an antenna port 0 can be basically used. If a user equipment is able to reliably detect a cell-specific RS (R1) for an antenna port 1, it is able to determine RSRP using R1 in addition to R0. The standard document (e.g., 3GPP TS36.211) can be referred to for details of the cell-specific RS.

RSRQ is defined as a value resulting from dividing a value, which results from multiplying RSRP by the number N of resource blocks in a measured frequency bandwidth, by 'E-UTRA carrier RSSI' (i.e., RSRQ=N×RSRP/(E-UTRA carrier RSSI)). The numerator (N×RSRP) and the denominator (E-UTRA carrier RSSI) are measured for the same resource block set.

The 'E-UTRA carrier RSSI' includes a linear average of total reception power measured on signals, which are received from all sources including common-channel serving and non-serving cells, neighboring channel interference, thermal noise and the like, by a user equipment for OFDM symbols including a reference symbol (i.e., CRS for the antenna port 0) for an antenna port 0 in a measurement bandwidth across N resource blocks 'UTRA FDD carrier RSSI' is defined as a received wideband power, which includes noise and thermal noise generated from a receiver, in a bandwidth defined by a receiver pulse forming filter.

'UTRA TDD carrier RSSI' is defined as a received wideband power, which includes noise and thermal noise generated from a receiver, in a bandwidth defined by a receiver pulse forming filter within a specific time slot.

Besides the aforementioned matters, the standard document (e.g., 3GPP TS36.214) can be referred to for the description of the DL channel measurement and its details shall be omitted for clarity of the following description. Yet, it is apparent that the contents disclosed in the standard for the DL channel measurement are applicable to DL channel measurements used by various embodiments of the present invention mentioned in the following description.

FIG. 7 is a diagram for one example of CSI-RS (channel state information reference signal) configurations.

CSI-RS is a DL reference signal introduced into 3GPP LTE-A system not for the purpose of demodulation but for the purpose of channel measurement. 3GPP LTE-A system defines a plurality of CSI-RS configurations for the CSI-RS transmission. In CSI-RS transmission configured subframes, CSI-RS sequence $r_{l,n_s}(m)$ is mapped to complex modulated symbols $a_{k,l}^{(p)}$ used as reference symbols on an antenna port p by the following formula.

$$a_{k,l}^{(p)} = w_{l''} \cdot r_{l,n_s}(m')$$ [Formula 7]

In this case, $w_{l''}$, k and l are given by the following formula.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$ [Formula 8]

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In this case, (k', l') and necessary conditions on $n_s$ are given by Table 4 and Table 5 for a normal CP and an extended CP, respectively. In particular, CSI RS configurations in Table 4 and Table 5 indicate locations of REs occupied by CSI-RS of each antenna port within an RB pair.

TABLE 4

| CSI reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |

TABLE 4-continued

| CSI reference signal configuration | | Number of CSI reference signals configured | | | | |
|---|---|---|---|---|---|---|
| | | 1 or 2 | | 4 | | 8 |
| | | (k', l') | $n_s$ mod 2 | (k', l') | $n_s$ mod 2 | (k', l') | $n_s$ mod 2 |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 5

| CSI reference signal Configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

FIG. 7 (a) shows 20 kinds of CSI-RS configurations 0 to 19 available for CSI-RS transmission by 2 CSI-RS ports among the CSI-RS configurations shown in Table 4, FIG. 7 (b) shows 10 kinds of CSI-RS configurations 0 to 9 available for CSI-RS transmission by 4 CSI-RS ports among the CSI-RS configurations shown in Table 4, and FIG. 7 (c) shows 5 kinds of CSI-RS configurations 0 to 4 available for CSI-RS transmission by 8 CSI-RS ports among the CSI-RS configurations shown in Table 4. In this case, the CSI-RS port means an antenna port configured for CSI-RS transmission. For instance, antenna ports 15 to 22 in Formula 8 correspond to CSI-RS ports. Since the CSI-RS configuration varies in accordance with the number of the CSI-RS ports, although a CSI-RS configuration number is identical, if the number of the antenna ports configured for the CSI-RS transmission is different, it results in a different CSI-RS configuration.

Unlike CRS configured to be transmitted in each subframe, CSI-RS is configured to be transmitted by each prescribed transmission period corresponding to a multitude of subframes. Hence, the CSI-RS configuration varies in accordance with a CSI-RS configured subframe as well as locations of REs occupied by CSI-RS in a resource block pair. Although a CSI-RS configuration number is identical in Table 4 or Table 5, if a subframe for CSI-RS transmission is different, it is able to assume that a CSI-RS configuration is different as well. For instance, if a CSI-RS transmission period ($T_{CSI-RS}$) is different or a CSI-RS transmission configured start subframe ($\Delta_{CSI-RS}$) is different in a single radio frame, it is able to assume that a CSI-RS configuration is different. In the following description, in order to distinguish a CSI-RS configuration number given CSI-RS configuration in Table 4 or Table 5 from a CSI-RS configuration varying in accordance with the CSI-RS configuration number, the number of CSI-RS port(s) and/or the CSI-RS configured subframe in Table 4 or Table 5, the latter configuration shall be called a CSI-RS resource configuration.

When an eNB informs a UE of CSI-RS resource configuration, the eNB can inform the UE of information on the number of antenna ports used for transmission of CSI-RSs, CSI-RS pattern, $I_{CSI-RS}$ (CSI-RS subframe configuration), $P_c$ (UE assumption on reference PDSCH transmitted power for CSI feedback), zero power CSI-RS configuration list, zero power CSI-RS subframe configuration and the like. The CSI-RS subframe configuration $I_{CSI-RS}$ is the information for specifying a subframe configuration period $T_{CSI-RS}$ and a subframe offset $\Delta_{CSI-RS}$ for occurrence of CSI-RSs. The following table shows one example of CSI-RS subframe configuration $I_{CSI-RS}$ in accordance with $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes that meet the following formula becomes subframes including CSI-RS.

$$(10n_f + \lfloor n_s/2 \rfloor - \Delta_{CSI-RS}) \bmod T_{CSI-RS} = 0 \quad \text{[Formula 9]}$$

UE set to a transmission mode (e.g., transmission mode 9, other newly defined transmission modes, etc.) defined after 3GPP LTE/LTE-A system performs a channel measurement using CSI-RS and is able to demodulate or decode PDSCH using UE-RS.

Figure 8:
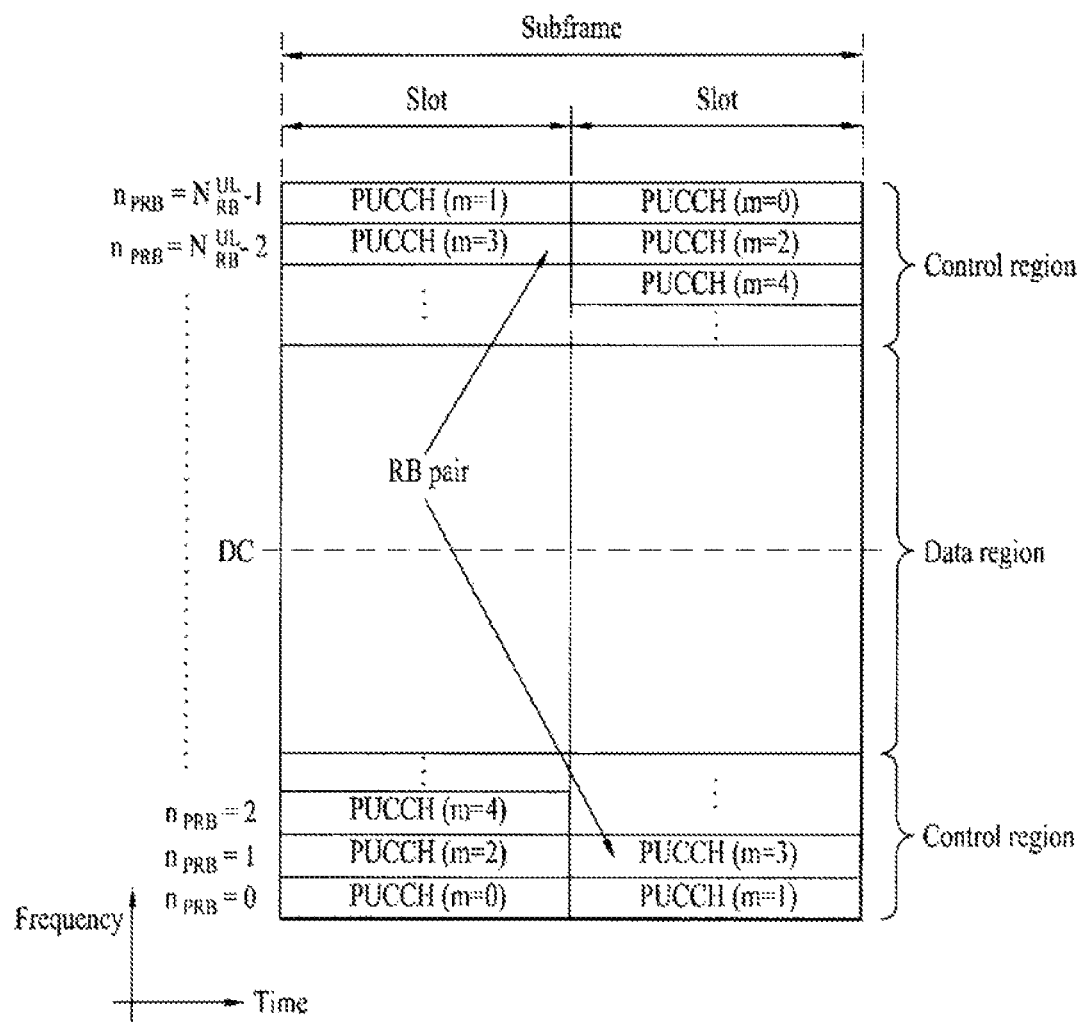
FIG. 8 is a diagram for one example of an uplink subframe used for a wireless communication system.

FIG. 8 is a diagram for one example of an uplink subframe used for a wireless communication system.

Referring to FIG. 8, a UL subframe can be divided into a control region and a data region in a frequency domain. One or more PUCCHs (physical uplink control channels) can be assigned to the control region to carry uplink control information (UCI). One or more PUSCHs (physical uplink shared channels can be assigned to the data region of the UL subframe to carry user data.

In the UL subframe, subcarriers distant from a DC (Direct Current) subcarrier are utilized as the control region. In other words, subcarriers located at both side ends of a UL transmission bandwidth are assigned to a transmission of UL control information. The DC subcarrier is a component left instead of being used for a signal transmission and is mapped to a carrier frequency $f_a$ in a frequency upconverting process. PUCCH for a single UE is assigned to an RB pair belonging to resources operating on a single carrier frequency and RBs belonging to the RB pair occupy different subcarriers in two slots, respectively. The above-assigned PUCCH is represented as an RB pair assigned to the PUCCH frequency-hops on a slot boundary. Yet, if the frequency hopping does not apply, the RB pair occupy the same subcarrier.

PUCCH can be used to transmit the following control information.

SR (Scheduling Request): Information used to request an uplink UL-SCH resource. This information is transmitted by OOK (On-Off Keying).

HARQ-ACK: Response to PDCCH and/or response to a DL data packet (e.g., codeword) on PDSCH. This information indicates whether PDCCH or PDSCH is successfully received. In response to a single DL codeword, HARQ-ACK 1 bit is transmitted. In response to 2 DL codewords, HARQ-ACK 2 bits are transmitted. HARQ-ACK response includes a positive ACK (simply, ACK), a negative ACK (hereinafter abbreviated NACK), a DTX (Discontinuous Transmission) or NACK/DTX. In this case, the terminology 'HARQ-ACK' is interchangeably usable with HARQ ACK/NACK or ACK/NACK.

CSI (Channel State Information): Feedback information on a DL channel. MIMO-related (Multiple Input Multiple Output-related) feedback information includes RI (Rank Indicator) and PMI (Precoding Matrix Indicator).

Figure 9:
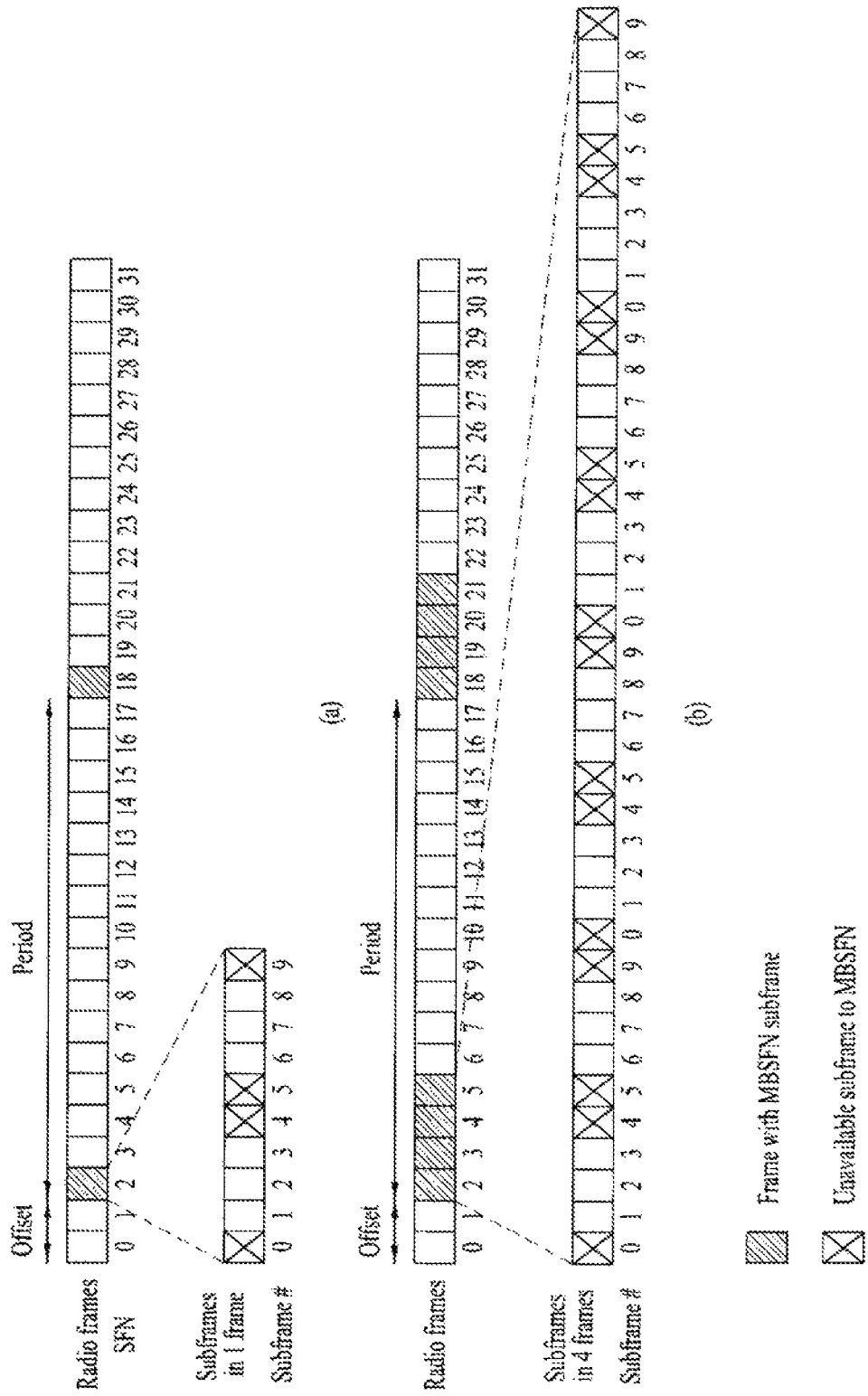
FIG. 9 is a diagram to describe a method of configuring a subframe for MBSFN in 3GPP LTE-A.

FIG. 9 is a diagram to describe a method of configuring a subframe for MBSFN in 3GPP LTE-A.

In 3GPP LTE-A system, in order to support a DL transmission from a single point to multi-points, 2 logical channels respectively called MCCH (Multicast Control Channel) and MTCH (Multicast Traffic Channel) are defined. The MCCH is used to transmit control messages of all MBMS services on a single MBSFN region, while the MTCH is used to transmit session data of a single MBMS service. The session data is related to contents of the MBMS service. Both of the MCCH and the MTCH are mapped to a transport channel called MCH (Multicast Channel). The MCH is mapped to PMCH among physical channels. Several PMCHs can exist depending on features of MBMS service. And, the PMCH is transmitted in an MBSFN subframe only. A subset of DL subframe in a radio frame on a carrier supportive of PDSCH transmission can be set as an MBSFN subframe by an upper layer signal.

A UE receives an upper layer signal indicating an MBSFN subframe and is then able to know what kind of subframe is reserved for MBSFN. The upper layer signal for defining subframes reserved for MBSFN in DL (hereinafter, such subframes shall be abbreviated MBSFN subframes) may include information on an assignment period of a radio frame having an MBSFN subframe and an assignment offset for specifying a start location of the radio frame having the MBSFN subframe. Referring to FIG. 9, for example, if a UE receives an upper layer signal having an assignment period set to 8 and an assignment offset set to 2, the UE can determine that radio frames having an SFN, of which result from performing a modulo operation on a system frame number (SFN) with the assignment period '8' gets equal to the assignment offset '2', have the MBSFN subframe. In particular, the UE can be aware that MBSFN subframe is included in a radio frame having an SFN amounting to "SFN mod (period)=offset". Meanwhile, the upper layer signal includes a bitmap configured with 6 bits one-to-one corresponding to subframes #1, #2, #3, #6, #7 and #8 among subframes #0 to #9 within a single radio frame or a bitmap configured with 24 bits one-to-one corresponding to subframes #1, #2, #3, #6, #7 and #8 of each of 4 contiguous radio frames. An eNB is able to assign PMCH to a subframe matched to '1' in the 6- or 24-bit bitmap and is able to transmit an MBSFN service, i.e., MBMS, on the PMCH within the subframe. The UE assumes that a subframe corresponding to a bit matched to '1' in the 6- or 24-bit bitmap is a subframe reserved for MBSFN and is then able to receive the MBMS through the PMCH in the subframe.

Figure 10:
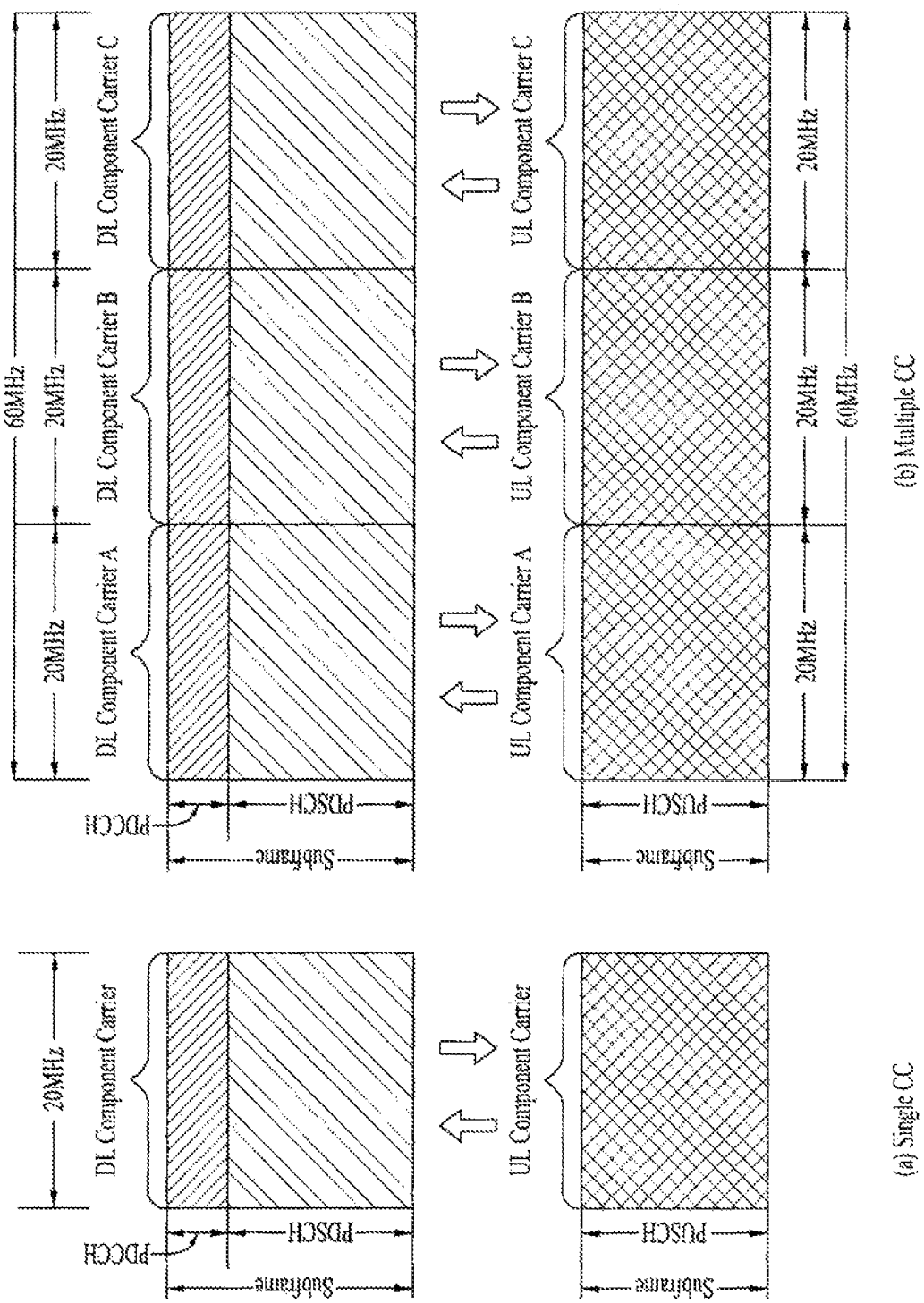
FIG. 10 is a diagram to describe a single carrier communication and a multicarrier communication.

FIG. 10 is a diagram to describe a single carrier communication and a multicarrier communication. Particularly, FIG. 10 (*a*) shows a subframe structure of a single carrier. And, FIG. 10 (*b*) shows a subframe structure of a multicarrier.

Referring to FIG. 10 (*a*), a general wireless communication system may perform a data transmission or reception through a single DL band and a single UL band corresponding to the single DL band [in case of frequency division duplex (FDD) mode] or may perform a data transmission or reception through UL/DL time unit by dividing a prescribed radio frame into a UL time unit and a DL time unit in a time domain [in case of time division duplex (TDD) mode]. Yet, in order to use a wider frequency band in a wireless communication system, introduction of carrier aggregation (or bandwidth aggregation) technology, which uses a wider UL/DL bandwidth by aggregating a plurality of UL and/or DL frequency blocks, is currently discussed. The carrier aggregation differs from OFDM (orthogonal frequency division multiplexing) system, which performs a DL or UL communication by carrying a basic frequency band divided into a plurality of orthogonal subcarriers on a single carrier frequency, in performing a DL or UL communication suing a plurality of carrier frequencies. In the following description, each carrier aggregated by the carrier aggregation shall be called a component carrier (CC). Referring to FIG. 10 (*b*), as 3 CCs of 20 MHz are aggregated in each of UL and DL, it is able to support a bandwidth of 60 MHz. Although FIG. 10 (*b*) shows a case that a bandwidth of UL CC is symmetric and equal to that of DL CC overall, the bandwidth of each CC can be independently determined. Moreover, asymmetric carrier aggregation, in which the number of UL CCs is different from that of DL CCs, is possible. DL/UL CC limited to a specific UE may be called a configured serving UL/DL CC in the specific UE.

Figure 11:
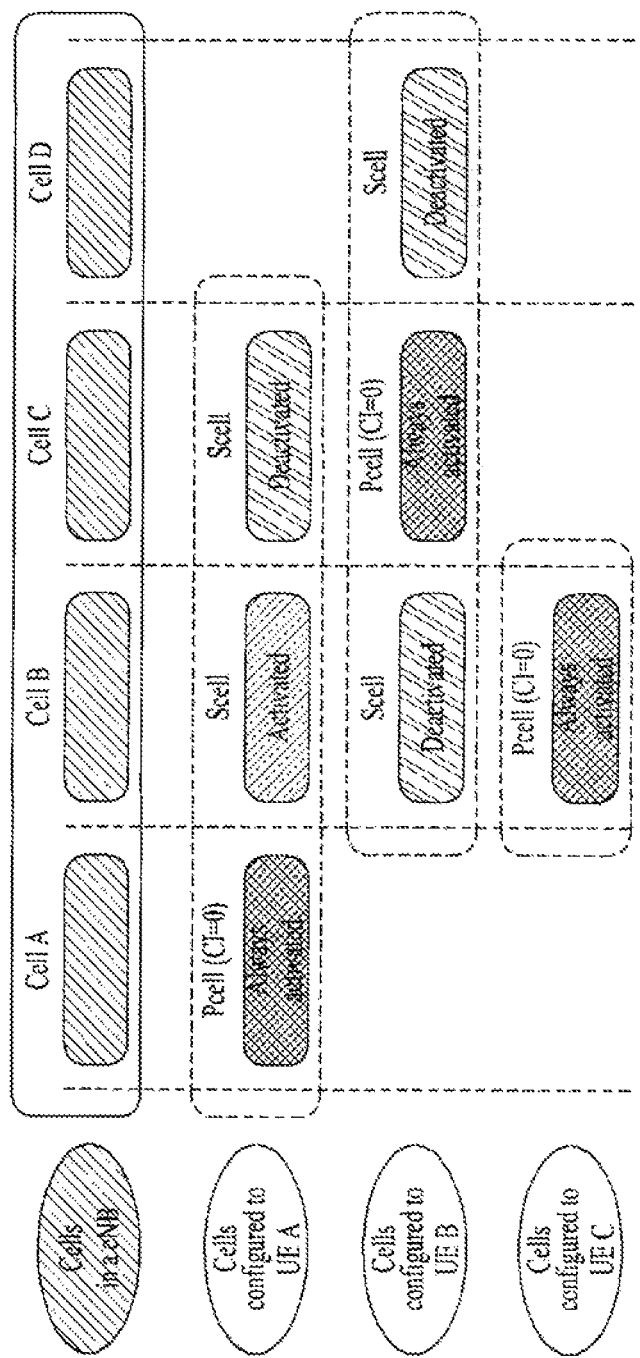
FIG. 11 is a diagram for one example of a method of activating serving UL/DL component carriers (CCs) configured for a specific UE entirely or in part or deactivating the serving UL/DL CCs in part.

FIG. 11 is a diagram for one example of a method of activating serving UL/DL component carriers (CCs) configured for a specific UE entirely or in part or deactivating the serving UL/DL CCs in part. First of all, an eNB is able to use serving CCs configured in the UE for a communication with the UE by activating the serving CCs entirely or in part or by deactivating the CCs in part. An activated cell is a cell configured to actually transmit PDSCH/PUSCH among the configured serving CCs and performs a CSI report and SRS transmission for the PDSCH/PUSCH transmission. A deactivated cell is a cell configured not to perform a PDSCH/PUSCH transmission by a command of the eNB or an operation of a timer and the CSI report and the SRS transmission are stopped.

The eNB can change the CC to be activated/deactivated and is also able to the number of the CCs to be activated/deactivated. If the eNB assigns CC available for the UE cell-specifically or UE-specifically, at least one of the assigned CCs is not deactivated unless the CC assignment to the UE is reconfigured overall or the UE makes a handover. The CC, which is not deactivated unless the overall reconfiguration of the CC assignment to the UE, is named a primary CC (PCC). The CC freely activated/deactivated by the eNB is named a secondary CC (SCC). PCC and SCC can be distinguished from each other with reference to a control information. For instance, as a specific control information can be configured to be transmitted/received through a specific CC only, such a specific CC can be named PCC, while the rest of CC(s) is named SCC(s).

According to the example shown in FIG. 11, serving UL/DL CCs are configured for UE A to UE C. In particular, Cells A to C are configured as serving UL/DL CC for the UE A, Cells B to D are configured as serving UL/DL CC for the UE B, and only Cell B is configured as serving UL/DL CC for the UE C.

Looking into the serving UL/DL CC configured for the UE A, the Cell C is deactivated, while the Cell A and the Cell B are activated. Since the Cell A for the UE A is PCC, the eNB always activates the Cell A for the UE A but is able to freely activate/deactivate the Cell B and the Cell C corresponding to SCCs.

Looking into the serving UL/DL CC configured for the UE B, the Cell C is activated, while the Cell B and the Cell D are activated. Since the Cell C for the UE B is PCC, the eNB always activates the Cell C for the UE B likewise but is able to freely activate/deactivate the Cell B and the Cell D corresponding to SCCs.

Looking into the serving UL/DL CC configured for the UE C, the Cell B is activated. Since only a single CC is configured for the UE C, the single CC works as PCC. And, the eNB always activates the PCC.

Meanwhile, in order to manage a radio resource, 3 GPP LTE/LTE-A uses the concept of a cell. The cell is defined as a combination of DL resources and UL resources, i.e., a combination of DL CC and UL CC. A cell may be configured with DL resources only or a combination of DL resources and UL resources. In case that carrier aggregation is supported, a linkage between a carrier frequency of DL resource (or DL CC) and a carrier frequency between UL resource (or UL CC) may be indicated by a system information. For instance, a combination of DL resources and UL resources can be indicated by a system information block type 2 (SIB2) linkage. In this case, the carrier frequency means a center frequency of each cell or CC. In the following description, a cell operating on a primary frequency shall be named a primary cell (PCell) or PCC and a cell operating on a secondary frequency shall be named a secondary cell (SCell) or SCC. A carrier corresponding to PCell in DL is called a DL primary CC (DL PCC) and a carrier corresponding to PCell in UL is called a UL primary CC (UL PCC). SCell means a cell which is configurable after completion of RRC (radio resource control) connection establishment and available for the provision of an additional radio resource. In accordance with capabilities of UE, SCell is able to from a set of serving cells for the UE together with PCell. A carrier corresponding to SCell in DL is called a DL secondary CC (DL SCC) and a carrier corresponding to the SCell in UL is called a UL secondary CC (UL SCC). In case of a UE failing to have carrier aggregation configured or support carrier aggregation despite being in RRC_CONNECTED state, a single serving cell configured with PCell only exists.

As mentioned in the foregoing description, a terminology 'cell' used for carrier aggregation is distinguished from a terminology 'cell' indicating a predetermined geographical area in which a communication service is provided by a single eNB or a single antenna group. In order to distinguish a cell indicating a predetermined geographical area and a cell of carrier aggregation from each other, according to the present invention, a cell of carrier aggregation shall be named CC and a cell of a geographical area shall be named a cell.

In an existing LTE/LTE-A system, when a plurality of CCs are used by being aggregated together, on the assumption that CCs located not so far from each other in a frequency domain are aggregated, a UL/DL frame time synchronization of SCC is assumed as matching a time synchronization of PCC. Yet, it is possible that a plurality of CCs, which have a UE belong to different frequency bands or are considerably spaced apart from each other on a frequency (i.e., differing in propagation properties), will be aggregated. In this case, the assumption that a time synchronization of PCC is equal to that of SCC according to a related art may seriously affect synchronization of DL/UL signal of SCC.

Meanwhile, in case of LCT CC, as mentioned in the foregoing description with reference to FIGS. 1 to 8, radio resources available for transmission/reception of physical UL/DL channels and radio resources available for transmission/reception of physical UL/DL signals are previously determined among radio resources operating on the LCT CC. So to speak, LCT CC should be configured to carry a corresponding physical channel/signal through a specific time frequency on a specific time resource in accordance with a type of the physical channel/signal instead of being configured to carry physical channels/signals through a random time frequency on a random time resource. For instance, physical DL control channels may be configured in OFDM symbol(s) at the head of OFDM symbols of DL subframe only but PDSCH cannot be configured in the head OFDM symbol(s) to which physical DL control channels are possibly mapped. For another instance, CRS(s) corresponding to antenna port(s) of eNB is transmitted on the REs shown in FIG. 6 across total band in every subframe irrespective of DL BW of the eNB. Hence, in case that the number of antenna port(s) of the eNB is 1, the REs denoted by '0' in FIG. 6 are not available for different signal transmission. In case that the number of antenna ports of the eNB is 4, the REs denoted by '0', '1', '2' and '3' in FIG. 6 are not available for different signal transmission. Besides, various restrictive conditions on the configuration of LTC CC exist. And, such restrictive conditions have increased considerably due to the development of a communication system. Since some of the restrictive conditions were made to keep up with the previous communication technology level on making the corresponding restrictive conditions, they may become unnecessary owing to the ongoing development of the communication technology. And, both a restrictive condition for an existing technology and a restrictive condition for a new technology may exist for the same purpose at the same time. As too many restrictive conditions are made, the restrictive conditions introduced for the development of a communication system work as factors of preventing radio resources of a corresponding CC from being efficiently used. Hence, the ongoing discussion is made on the introduction of NCT CC, which is configurable in accordance with restrictive conditions simplified further than the existing restrictive conditions, free from the restrictive conditions unnecessary owing to the development of the communication technology. Since NCT CC is not configured on the restrictive conditions of an existing system, it is not recognizable by an UE implemented in accordance with the existing system. In the following description, a UE incapable of supporting NCT CC due to implementation in accordance with an existing system shall be named a legacy UE and a UE implemented to support NCT CC shall be named an NCT UE.

A future LTE-A system considers using NCT CC as SCC. Since NCT CC does not consider a use by a legacy UE, it is unnecessary for the legacy UE to perform a cell search, a cell selection, a cell reselection and the like on NCT CC. In case that NCT CC is used not as PCC but as SCC only, since it is able to reduce unnecessary restrictive conditions on SCC in comparison with an existing LCT CC usable as PCC, CC can be used more efficiently. Yet, time/frequency synchronization of NCT CC may not match that of PCC. Although time/frequency synchronization of NCT CC is obtained once, the time/frequency synchronization may vary due to a change of a communication environment. Hence, RS for using time synchronization and/or frequency synchronization of NCT CC for tracking is necessary. Moreover, RS for enabling a UE to detect NCT CC in a neighbor cell search procedure is necessary as well. CRS is usable for the purposes of time/frequency synchronization of NCT CC, a neighbor cell search using NCT CC and the like. CRS can be configured in NCT CC in the same form of the existing LTE/LTE-A system shown in FIG. 6. Alternatively, CRS may be configured in NCT CC to have a density smaller on a time or frequency axis than that of the existing LTE/LTE-A system.

According to the present invention, it is proposed that CRS on NCT CC is configured to have density smaller on a time axis than that of CRS on LCT CC of an existing LTE/LTE-A system. Hence, according to the present invention, NCT CC may not meet at least one of the restrictive condition that CRS should be configured in a corresponding cell in every DL subframe, the restrictive condition that CRS should be configured per antenna port of an eNB in a corresponding cell, the restrictive condition that CRS should be transmitted across total band, and the restrictive condition that a prescribed number of head OFDM symbols of a DL subframe should be reserved for a transmission of a control channel (e.g., PDCCH, etc.) across a whole frequency band of a corresponding CC. For instance, on NCT CC, CRS may be configured not in every subframe but in very bundle of a prescribed number (>1) of subframes. For another instance, on NCT CC, CRS for a single antenna port (e.g., antenna port 0) may be configured irrespective of the number of antenna ports of an eNB. Alternatively, instead of an existing CRS for channel state measurement and demodulation, a TRS (tracking RS) for tracking of time synchronization and/or frequency synchronization is newly defined. And, the TRS can be configured in a partial subframe and/or a partial frequency resource on NCT CC. In particular, in aspect of transmission of RS, LCT CC carries CRS fixed across a whole band in partial OFDM symbols at the head part of every subframe. On the other hand, on NCT CC, a transmission of the fixed CRS having high density may be omitted or can be considerably reduced. Moreover, although a transmission of CRS on LCT CC is fixed, a transmission timing point of CRS, a transmitting band, a transmitting antenna port and the like are configurable for a CRS transmission on NCT CC. Alternatively, PDSCH may be configured in head OFDM symbols on NCT CC, PDCCH may be configured not in the head OFDM symbols but in an existing PDSCH region, or PDCCH may be configured using partial frequency resource. In the following description, a CRS or new RS used for tracking only shall be named TRS. Since TRS is not used for demodulation, the TRS corresponds to an RS for measurement in aspect of usage. Moreover, on NCT CC, through UE-RS based DL data reception and channel state measurement on the basis of CSI-RS having relatively low density (i.e., relatively low density configurable), DL reception performance can be enhanced and RS overhead can be minimized. Hence, DL resource can be efficiently used. For instance, CRS is transmitted as default in DL on LCT CC. Yet, on NCT CC, UE-RS for demodulation of DL data and CSI-RS for channel state measurement may be transmitted only without CRS.

When NCT CC is used as SCC, it can be categorized into the following two cases depending on a presence or non-presence of synchronization with other CC. First of all, NCT CC includes 'synchronized NCT CC (synchronization new carrier type component carrier)' time/frequency-synchronized with a portion or whole part of other carrier-aggregated CCs. Secondly, NCT CC may include 'unsynchronized NCT CC' failing to be time/frequency-synchronized with other carrier-aggregated CCs.

Meanwhile, PSS/SSS and CRS (or tracking RS) necessary for synchronization may not be transmitted on NCT CC. Even if they are transmitted, a UE may not use them for synchronization. According to the present invention, a UE is able to perform a time and/or frequency synchronization on a specific NCT CC for synchronization of the specific NCT CC using a synchronization signal of a CC intended to be taken as a reference. In particular, according to the present invention, in case of a specific NCT CC, which fails to have a signal necessary for synchronization in itself or which does not use the signal necessary for synchronization despite an existence of the corresponding signal, there exists a reference CC for enabling a UE to synchronize a time and/or frequency of the specific NCT CC. In the following description, the CC becoming the reference shall be named a synchronization reference CC (component carrier). Moreover, in the following description, when a UE obtains a signal or information for synchronization of a corresponding CC not through the corresponding CC but through a synchronization reference CC associated with the corresponding CC, the corresponding CC shall be named 'synchronized NCT CC). Time and/or frequency synchronization signal shall be described later.

As a synchronization reference CC for an NCT CC synchronized with a different CC, it is able to consider using an LCT CC. Yet, in case that NCT is developed into an independently used type (i.e., NCT CC of this type shall be named a stand-alone NCT CC (new component carrier) not like an SCC type but like a PCC type, the stand-alone NCT CC can be used as a synchronization reference CC. Moreover, an unsynchronized NCT CC or a synchronized NCT CC used as SCC may be usable as a synchronization reference CC of a specific synchronized NCT CC. Hence, according to one embodiment of the present invention, it is proposed to use an NCT CC as a synchronization reference CC as well as an LCT CC. Moreover, according to one embodiment of the present invention, the relation supposed to be established between a synchronization reference CC and a synchronized NCT CC is proposed.

<1. Types of NCT CC Available for Synchronization Reference CC>

According to one embodiment of the present invention, in case that an NCT CC is used as a synchronization reference CC, types of the NCT CC are proposed as follows.

LCT (legacy carrier type) carrier
Unsynchronized NCT CC (Unsynchronized New Carrier Type Component Carrier)
Synchronized NCT CC (Synchronized New Carrier Type Component Carrier)
Stand-alone NCT CC (stand-alone New Carrier Type Component Carrier)

The above-enumerated types of NCT CC can become references for time and/or frequency synchronization of a specific NCT CC. In the following description, types of each synchronization reference CC shall be explained in detail with reference to the examples of synchronization reference CC.

Figure 12:
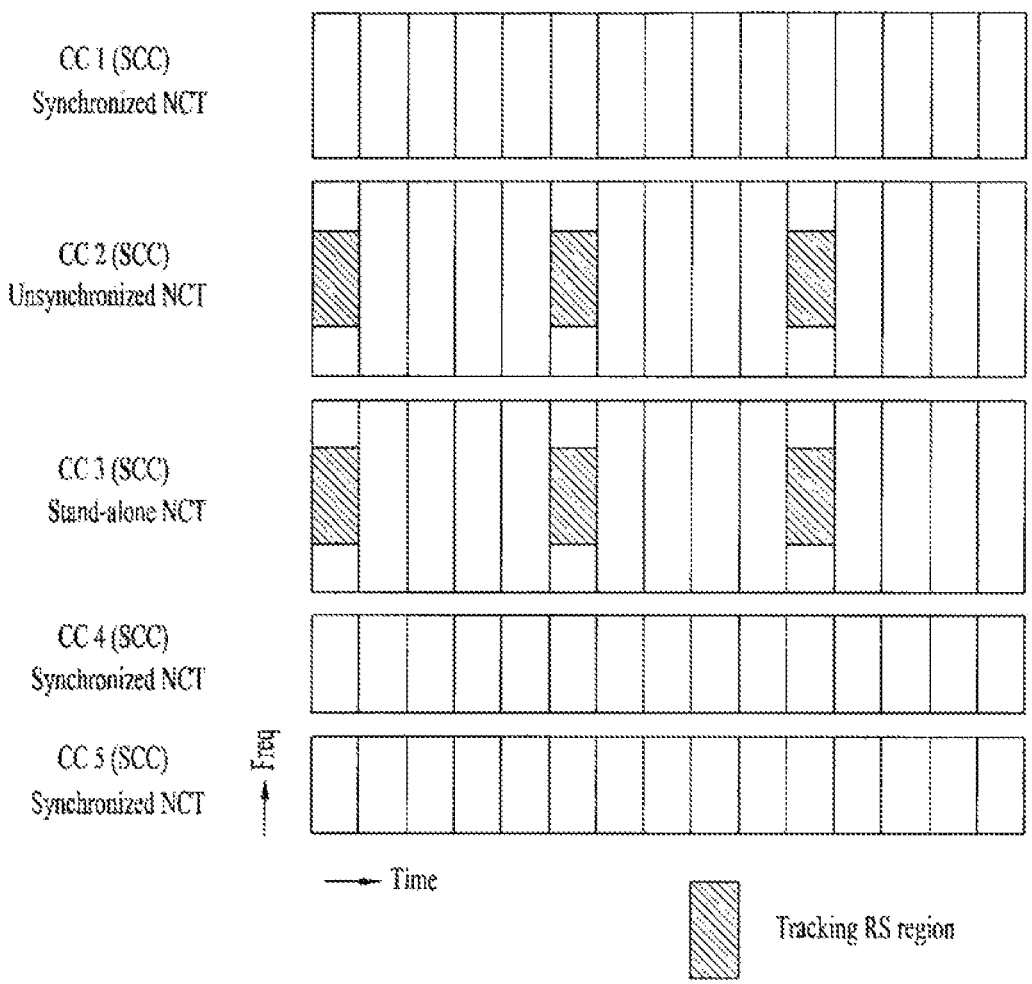
FIG. 12 is a diagram to describe types of synchronization reference CC that can become a reference of a synchronized new carrier type (NCT) CC according to one embodiment of the present invention.

FIG. 12 is a diagram to describe types of synchronization reference CC that can become a reference of a synchronized new carrier type (NCT) CC according to one embodiment of the present invention. According to the example shown in FIG. 12, CC1 to CC5 are assumed as carrier-aggregated, CC3 is assumed as working as PCC, and the rest of CCs (i.e., CC1, CC2, CC4 and CC5) are assumed as SCCs, respectively. Moreover, CC1, CC4 and CC5 among the carrier-aggregated CCs are assumed as synchronized NCT CCs, CC2 is assumed as an unsynchronized NCT CC, and CC3 is assumed as a stand-alone NCT CC.

(1) LCT Carrier

For the synchronization of a specific NCT CC, a carrier becoming a reference of synchronization may include an LCT carrier, i.e., a carrier used before 3GPP LTE Release-10.

(2) Unsynchronized NCT CC-CC2 in the Example Shown in FIG. 12

An LCT CC configured as a PCC or an unsynchronized NCT CC usable as an SCC by being aggregated on a stand-alone NCT CC can be used as a synchronization reference CC. In other words, according to one embodiment of the present invention, a carrier becoming a reference for synchronization of a specific NCT CC may include an unsynchronized NCT CC. The CC2 shown in FIG. 12 is one example of the unsynchronized NCT CC. For instance, a CC, of which time/frequency synchronization fails to match that of other CCs carrier-aggregated for the synchronization of a synchronized NCT CC (e.g., CC1, CC4, or CC5), i.e., CC2 corresponding to an unsynchronized NCT CC can be used as a synchronization reference CC. In this case, a UE is able to receive an identification information of a CC, which is to be used as a synchronization reference CC for the synchronized NCT CC (e.g., CC1, CC4, or CC5), from an eNB. And, the identification information may include an identification information indicating the CC2.

(3) Stand-Alone NCT CC-CC3 in the Example Shown in FIG. 12

According to one embodiment of the present invention, a stand-alone NCT CC may be usable as a carrier that becomes a reference for synchronization of a specific NCT CC. The CC3 show in FIG. 12 is one example of the carrier. For instance, the synchronized NCT CC (e.g., CC1, CC4, or CC5) can use the CC3 corresponding to the stand-alone NCT CC as a synchronization reference CC. In this case, a UE is able to receive an identification information of a CC, which is to be used as a synchronization reference CC for the synchronized NCT CC (e.g., CC1, CC4, or CC5), from an eNB. And, the identification information may include an identification information indicating the CC3.

(4) Synchronized NCT CC—CC1, CC4 and CC5 in the Example Shown in FIG. 12

An LCT CC configured as a PCC or a synchronized NCT CC usable as an SCC by being aggregated on a stand-alone NCT CC can be used as a synchronization reference CC. In other words, a synchronized NCT CC can become a reference CC for synchronization of a specific NCT CC. in this case, the synchronized NCT CC becoming the reference can be configured as an SCC in carrier aggregation operation. For instance, CC1, CC4 or CC5 can used as the reference CC. in particular, the CC4 can be used as the synchronization reference CC of the CC5 that is the synchronized NCT CC. A synchronization reference CC of a specially synchronized NCT CC may be a CC that does not use the synchronized NCT CC as the synchronization reference CC.

Meanwhile, according to one embodiment of the present invention, it is proposed to configure at least one CC as synchronization reference CC. In particular, at least one CC can be designated as a synchronization reference CC for a specific NCT CC by an eNB. All/some of CCs usable as synchronization reference CC for synchronization of a synchronized NCT CC can be actually used as synchronization reference CC.

Moreover, according to one embodiment of the present invention, it is proposed that a synchronization reference CC may include a CC failing to be configured for a UE. For instance, although a synchronization reference CC for a synchronized NCT CC configured for a UE is a CC failing to be configured for the corresponding UE, the UE should periodically perform time/frequency synchronization and time/frequency tracking using PSS/SSS, CRS or TRS of the corresponding CC.

An eNB should provide an information on a synchronization reference CC of a synchronized NCT CC to a UE that uses the synchronized NCT CC.

Therefore, according to the present invention, in case that a synchronization reference CC is an LCT CC, it is proposed that an eNB informs a UE of all or some of a center frequency, a bandwidth (BW), a cell ID, a CSI-RS configuration, the number of CRS antenna ports and an MBSFN (Multicast broadcast single frequency network) subframe location of the synchronization reference CC. Based on the above information on the synchronization reference CC, the UE obtains synchronization information from the synchronization reference CC. The UE is then able to perform synchronization on a specific NCT CC associated with the synchronization reference CC using the obtained synchronization information. Moreover, according to the present invention, if a synchronization reference CC is an NCT CC, it is proposed that an eNB informs a UE of a center frequency, a bandwidth, a cell ID, a CSI-RS configuration, a CRS transmission period, a CRS transmission bandwidth, a CRS subframe location, a PSS/SSS transmission period and an MBSFN subframe location of the synchronization reference CC. Likewise, in case that a synchronization reference CC is not configured for a UE, an eNB is able to transmit information on the synchronization to the UE. Based on the above information on the synchronization reference CC, the UE obtains synchronization information from the synchronization reference CC. The UE is then able to perform synchronization on a specific NCT CC associated with the synchronization reference CC using the obtained synchronization information.

<2. Comparison of Synchronization Method Per Type of Synchronization Reference CC>

Time/frequency synchronization of a specific NCT CC follows a synchronization reference CC of the specific NCT CC. Hence, once a synchronization reference CC of a specific NCT CC is determined, time/frequency synchronization of the specific NCT CC is performed using the determined synchronization reference CC. A time/frequency synchronization method in accordance with a type of a synchronization reference CC can follow the following method and is described in detail with reference to FIG. 13 as follows.

Figure 13:
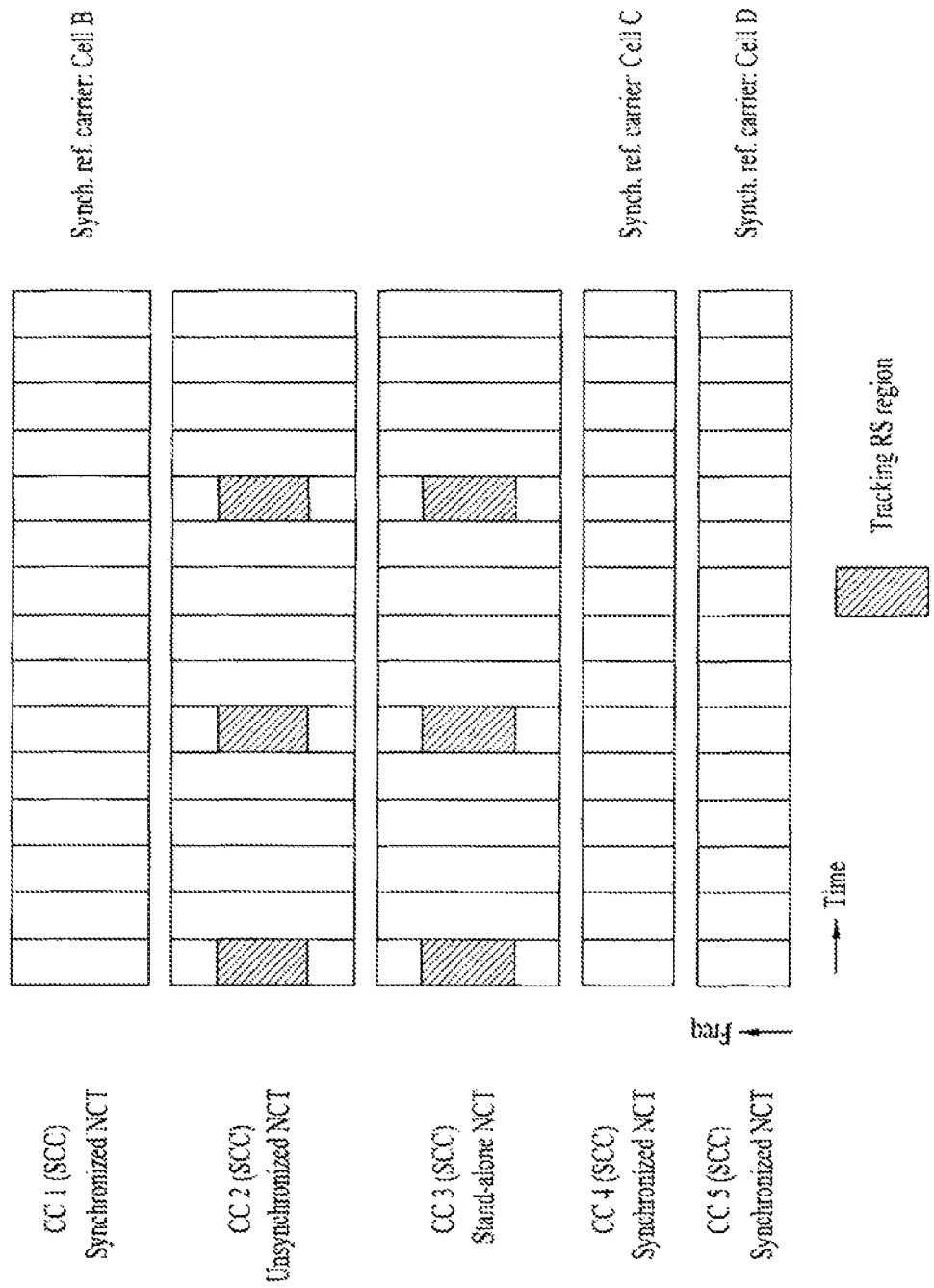
FIG. 13 is a diagram for one example of a radio resource measurement (RRM) method of synchronized NCT CC (new carrier type component carrier).

FIG. 13 is a diagram for one example of a radio resource measurement (RRM) method of synchronized NCT CC (new carrier type component carrier).

(1) Case that an Unsynchronized NCT CC or a Stand-Alone NCT CC is a Synchronization Reference CC In case that a synchronization reference CC is an unsynchronized NCT CC or a stand-alone NCT CC, a UE is able to use a synchronization information of the synchronization reference CC to obtain a synchronization information of a synchronized NCT CC. To this end, the UE can be provided with a subframe information on a subframe for transmitting a tracking RS of an NCT CC used as the synchronization reference CC and an information on a bandwidth (BW) for transmitting the tracking RS. For instance, an information (in this case, the CRS may be an RS signal performing a tracking function of correction to maintain time/frequency synchronization. Namely, the CRS transmitted subframe information may include an information on the subframe for transmitting the tracking RS) on a subframe for transmitting a CRS on the synchronization reference CC and an information on a size of the CRS transmitted bandwidth (or, a size of the bandwidth for transmitting the tracking RS) can be provided as the information on the synchronization reference CC to the UE. Subsequently, the UE obtains a synchronization information from the synchronization reference CC based on the information on the synchronization reference CC and then performs a synchronization of the synchronized NCT CC using the synchronization information.

(2) Case that a Synchronized NCT CC Becomes a Reference

Described in the following is a case that a synchronization reference CC of one synchronized NCT CC (hereinafter named a $1^{st}$ synchronized NCT CC, for clarity of the following description) is another synchronized CC (hereinafter named a $2^{nd}$ synchronized NCT CC, for clarity of the following description). In this case, a UE is able to use a synchronization information of the $2^{nd}$ synchronized NCT CC corresponding to the synchronization reference CC to perform a synchronization of the $1^{st}$ synchronized NCT CC. For instance, according to the present invention, the UE can use the synchronization information of the $2^{nd}$ synchronized NCT CC corresponding to the synchronization reference CC to obtain a synchronization information for the $1^{st}$ synchronized NCT CC. For instance, referring to FIG. 13, assume that a synchronization reference CC for a synchronized NCT CC is determined. In particular, assume that a synchronization reference CC of a CC5 is a CC4, that a synchronization reference CC of the CC4 is a CC3, and that a synchronization reference CC of a CC1 is a CC2. In this case, the CC4 corresponding to the synchronization reference CC used by the UE to obtain a synchronization of the CC5 is a synchronized NCT CC as well. Hence, the UE can use the synchronization of the CC3 corresponding to the synchronization reference CC of the CC4 corresponding to the synchronization reference CC of the CC5. To this end, if a synchronization reference CC of a synchronized NCT CC corresponding to a synchronization reference CC of a specific NCT CC is an unsynchronized NCT CC or a stand-along NCT CC, the UE can be provided with an information on a subframe for transmitting a tracking RS of the unsynchronized or stand-alone NCT CC and an information on a size of a bandwidth for transmitting the tracking RS. Based on this, the UE is able to perform a synchronization of the specific NCT CC using the synchronization information of the unsynchronized NCT CC or the synchronization of the stand-alone NCT CC.

Moreover, according to one embodiment of the present invention, if at least two CCs are designated as synchronization CCs for a specific NCT CC, it is proposed that a UE uses all or some of the at least two CCs designated as the synchronization reference CCs in performing a synchronization of the specific NCT CC. For instance, the UE averages all or some time/frequency synchronization informations of the synchronization reference CCs and is then able to utilize the averaged information as a synchronization information of the specific NCT CC. In case that $1^{st}$ to $3^{rd}$ synchronization reference CCs are designated for a specific NCT CC, time/frequency synchronization informations of the $1^{st}$ to $3^{rd}$ synchronization reference CCs are averaged and the averaged information can be used as a synchronization information for the specific NCT CC. For another instance, the UE is able to use a time/frequency information of a CC having a good channel state (e.g., RSRP, RSRQ, etc.) among all or some of NCT CCs designated as synchronization CCs as a synchronization information of the specific NCT CC. In case that $1^{st}$ to $3^{rd}$ synchronization reference CCs are designated for a specific NCT CC, the UE measures channel states (e.g., RRM (radio resource management) for the $1^{st}$ to $3^{rd}$ synchronization reference CCs and is then able to perform a synchronization of the specific NCT CC using some of the synchronization reference CCs having good channel states (e.g., RSRP, RSRQ, etc.) only.

<3. Measurement of RRM of Synchronized NCT CC>

According to the present invention, proposed is a following method for RSRP, RSRQ and/or pathloss of a synchronized NCT CC.

(1) Case that an Unsynchronized NCT CC or a Stand-Alone NCT CC is a Synchronization Reference CC In case that a synchronization reference CC is an unsynchronized NCT CC or a stand-alone NCT CC, a UE is able to use a CSI-RS of a synchronized NCT CC to measure RSRP, RSRQ and/or pathloss of the synchronized NCT CC. For instance, in performing a measurement of RRM of a synchronized NCT CC, a UE is able to perform the measurement using a CSI-RS received through the synchronized NCT CC instead of using a CRS. The reason for this is described as follows. First of all, a CRS may not be received through an NCT CC or may be received with low density. Yet, a CSI-RS may be allowed to be received in the same manner for LCT CC.

Alternatively, for a measurement for RRM of a synchronized NCT CC, a tracking RS of a synchronization reference CC may be used.

Alternatively, for a measurement for RRM of a synchronized NCT CC, a tracking RS and/or a CSI-RS of a synchronization reference CC may be used.

Alternatively, for a measurement for RRM of a synchronized NCT CC, a measurement method used for a synchronization reference CC may be used. In other words, a measurement on a synchronized NCT CC can be performed by a measurement method applied to a synchronization reference CC.

Alternatively, for a measurement for RRM of a synchronized NCT CC, a measurement value of a synchronization reference CC may be used as a measurement value of the synchronized NCT CC or a reference value for the measurement value.

In case that a synchronization reference CC is an unsynchronized NCT CC or a stand-alone NCT CC, a UE can be provided with an information (i.e., a location information of the subframe for transmitting the tracking RS) on a subframe for transmitting a tracking RS of the synchronization reference CC for an RRM of a synchronized NCT CC and/or an information on a size of a bandwidth for transmitting the tracking RS.

In case that a synchronization reference CC is an unsynchronized NCT CC or a stand-alone NCT CC, a UE can receive a CSI-RS configuration of the synchronization reference CC and/or an information on a CSI-RS signal subframe configuration value in order to use a CSI-RS of the synchronization reference CC.

(2) Case that a Synchronized NCT CC is a Synchronization Reference CC

In case that a synchronization reference CC is a synchronized NCT CC, a UE may use a CSI-RS of the synchronization reference CC or the synchronized NCT CC corresponding to a measurement target for RSRP, RSRQ and/or pathloss measurement of the synchronized NCT CC. In particular, in case that a synchronization reference CC of one synchronized NCT CC (hereinafter named a $1^{st}$ synchronized NCT CC, for clarity of the following description) is another synchronized CC (hereinafter named a $2^{nd}$ synchronized NCT CC), a UE may be able to use a CSI-RS of the $2^{nd}$ synchronized NCT CC to perform a measurement for RRM of the $1^{st}$ synchronized NCT CC. Alternatively, the CSI-RS of the $2^{nd}$ synchronized NCT CC corresponding to a synchronization reference CC of the $1^{st}$ synchronized NCT CC may be used for a measurement of the $1^{st}$ synchronized NCT CC. Alternatively, if a tracking RS (or CRS) exists in the $2^{nd}$ synchronized NCT CC, the tracking RS (or the CRS if received) may be used for the measurement on the $1^{st}$ synchronized NCT CC. For instance, referring to FIG. 11, the CC3 corresponding to the synchronization reference CC of the CC4 corresponding to the synchronization reference CC of the CC5 can be used for the RRM of the CC5.

Alternatively, if a tracking RS (or CRS) exists in a synchronization reference CC of a (different) synchronized NCT CC corresponding to a synchronization reference CC of a synchronized NCT CC (hereinafter named a target NCT CC), a tracking RS (or CRS) on the synchronization reference CC of the (different) synchronized NCT CC may be used for RRM of the target NCT CC. For instance, referring to FIG. 11, for RRM of the CC5, a UE can use a CSI-RS and/or a tracking RS (or CRS) on the CC3 corresponding to a synchronization reference CC of the CC4 corresponding to the synchronization reference CC of the CC5.

Alternatively, a measurement method used for a synchronization reference CC of a synchronized NCT CC may be used for RRM of the synchronized NCT CC. For instance, referring to FIG. 11, a UE can perform a measurement on the CC5 by the RRM measuring method used for the CC3 or CC4.

Alternatively, a measurement value used by a synchronization reference CC of a synchronized NCT CC may be used for the synchronized NCT CC. For instance, referring to FIG. 11, a UE is able to use a measurement value measured on the CC3 or CC4 for RRM of the CC5.

In case that a UE uses a tracking RS on a synchronization reference CC of a specific CC for RRM of the specific CC, in order for the UE to receive or detect the tracking RS, the UE can be provided with an information on a subframe for transmitting the tracking RS of the synchronization reference CC and an information on a size of a bandwidth for transmitting the tracking RS.

In case that a UE uses a CSI-RS on a synchronization reference CC of a specific CC for RRM of the specific CC, in order for the UE to receive or detect the CSI-RS, the UE can be provided with a CSI-RS configuration value for the synchronization reference CC and/or a CSI-RS subframe configuration value information.

Moreover, according to one embodiment of the present invention, in case that at least two synchronization reference CCs are configured for a specific synchronized NCT CC, a UE is proposed to use all or some of the synchronization reference CCs for measurement of RSRP, RSRQ and/or pathloss of the specific synchronized NCT CC. For instance, the UE averages RRM measurement values (e.g., RSRP, RSRQ and/or pathloss) of all or some of the synchronization reference CCs and is then able to use the averaged value as an RRM measurement information of the specific synchronized NCT CC. In case that $1^{st}$ to $3^{rd}$ synchronization reference CCs are configured for CC5, the UE averages RRM measurement values of all or some of the $1^{st}$ to $3^{rd}$ synchronization reference CCs and is then able to use the averaged value as an RRM measurement value of the CC5.

<4. Relation Between a Synchronized NCT CC and a Synchronization Reference CC>

According to an embodiment of the present invention, it is proposed to establish the following relation between a synchronized NCT CC and a synchronization reference CC. In consideration of the following relation, an eNB is able to configure carrier configuration for a UE.

Synchronization of a synchronized NCT CC should be identical or similar to that of a synchronization reference CC. The synchronized NCT CC and the synchronization reference CC are carriers transmitted from locations geographically close to each other. The reason for this is that carriers received from different locations failing to be geographically close to each other may differ from each other in TA (timing advance). In particular, it is preferable that the synchronized NCT CC and the synchronization reference CC belong to the same TAG (timing advanced group).

When cross-scheduling is performed, a carrier for performing a cross-scheduling on a synchronized NCT CC may be a synchronization reference CC. In this case, the synchronization reference CC should be configured in a UE that uses the synchronized NCT CC. Preferably, if the synchronized NCT CC is in active state, the synchronization reference CC should be in the active state as well.

Preferably, the synchronized NCT CC and the synchronization reference CC are located within the same band, i.e., an intra-frequency band. The reason for this is that, if the synchronized NCT CC and the synchronization reference CC are located on the same band, the same configuration is applied to UL/DL data and/or control signal. Hence, in a TDD transmission environment, the synchronized NCT CC and the synchronization reference CC preferable use the same UL/DL configuration. Moreover, since the synchronized NCT CC and the synchronization reference CC are transmitted from the same co-located antenna and overlaid, it may be preferable that a same special subframe configuration is used in the TDD transmission environment.

Preferably, the synchronized NCT CC and the synchronization reference CC use the same MBSFN subframe configuration. According to another embodiment of the present invention, a UE may not use an MBSFN subframe for a synchronized NCT CC.

Figure 14:
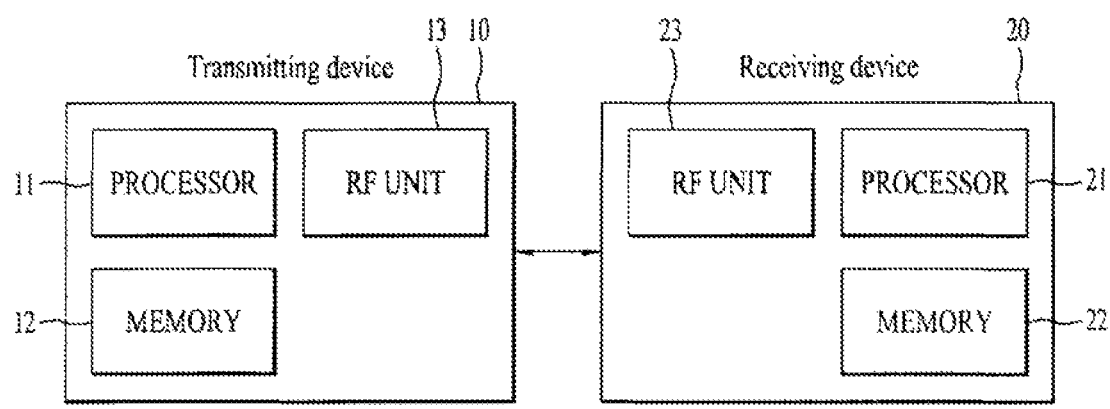
FIG. 14 is a block diagram of components of a transmitting device 10 and a receiving device 20 for implementing the present invention.

FIG. 14 is a block diagram of components of a transmitting device 10 and a receiving device 20 for implementing the present invention.

The transmitting/receiving device 10/20 includes an RF unit 13/23 configured to transmit or receive wireless signals carrying information and/or data, signals, messages and the like, a memory 12/22 configured to store various kinds of informations related to communications within a wireless communication system, and a processor 11/21 configured to control the memory 12/22 and/or the RF unit 13/23 to perform at least one of the aforementioned embodiments of the present invention by controlling the above-mentioned components in a manner of being operably connected to the components including the RF unit 13/23, the memory 12/22 and the like.

The memory 12/22 can store programs for the processing and control of the processor 11/21 and is able to temporarily store inputted/outputted information. And, the memory 12/22 can be utilized as a buffer.

The processor 11/21 controls normally overall operations of various modules within the transmitting/receiving device. Particularly, the processor 11/21 can perform various control functions for implementing the present invention. The processor 11/21 may be called one of a controller, a microcontroller, a microprocessor, a microcomputer and the like. The processor 11/21 may be implemented with hardware, firmware, software or a combination thereof. In case of implementing the present invention using hardware, such components configured to execute the present invention as ASICs (application specific integrated circuits), DSPs (digital signal processors), DSPDs (digital signal processing devices), PLDs (programmable logic devices), FPGAs (field programmable gate arrays) and the like can be provided to the processor 11/21. On the other hand, in case of implementing the present invention using firmware or software, the firmware or software may be configured to include modules, procedures, functions and the like for performing functions or operations of the present invention. The firmware or software configured to perform the present invention can be run by the processor 11/21 in a manner of being provided within the processor 11/21 or saved in the memory 12/22.

The processor 11 of the transmitting device 10 performs prescribed coding and modulation on a signal and/or data, which is to be externally transmitted by being scheduled by the processor 11 or a scheduler connected to the processor 11 and then transmits the coded or modulated signal and/or data to the RF unit 13. For instance, the processor converts a data sequence, which is to be transmitted, to k layers through demultiplexing, channel coding, scrambling, modulation and the like. The coded data sequence may be called a codeword and is equivalent to a transport block that is a data block provided by a MAC layer. A single transport block (TB) is coded into a single codeword. Each codeword is transmitted to the receiving device in form of at least one layer. For frequency upconverting, the RF unit 13 can include an oscillator. The RF unit 13 may include $N_t$ transmitting antennas, where $N_t$ is an integer equal to or greater than 1.

A signal processing procedure of the receiving device 20 is configured in a manner reverse to that of the transmitting device 10. Under the control of the processor 21, the RF unit 23 of the receiving device 20 receives a wireless signal transmitted by the transmitting device 10. The RF unit 23 may include $N_r$ receiving antennas. The RF unit 23 reconstructs each signal received through each of the receiving antennas into a baseband signal by frequency down-converting. For the frequency down-converting, the RF unit 23 may include an oscillator. The processor 21 can reconstruct data originally intended to be transmitted by the transmitting device 10 in a manner of performing decoding and demodulation on the wireless signal received through the corresponding receiving antenna.

The RF unit 13/23 includes at least one antenna. According to one embodiment of the present invention, under the control of the processor 11/21, the antenna plays a role in transmitting a signal processed by the RF unit 13/23 externally or a role in receiving a wireless signal externally and then forwarding the received wireless signal to the RF unit 13/23. The antenna may be called an antenna port. Each antenna may correspond to a single physical antenna or can be configured with a combination of at least two physical antenna elements. A signal transmitted from each antenna cannot be further resolved by the receiving device 20. A reference signal (RS) transmitted to correspond to a corresponding antenna defines an antenna in viewpoint of the receiving device 20 and enables the receiving device 20 to perform a channel estimation on the antenna irrespective of whether a channel is a single wireless channel from a single physical antenna or a composite channel from a plurality of physical antenna elements including the antenna. In particular, the antenna is defined such that a channel for delivering a symbol on the antenna can be derived from a channel for delivering another symbol on the same antenna. If an RF unit supports MIMO (multi-input multi-output) function of transceiving data using a plurality of antennas, it can be connected to at least two antennas.

According to embodiments of the present invention, a UE works as the transmitting device in UL or works as the receiving device 20 in DL. According to embodiments of the present invention, an eNB works as the receiving device 20 in UL or works as the transmitting device 10 in DL. In the following description, a processor, RF unit and memory provided to a UE shall be named a UE a UE processor, UE RF unit and UE memory, respectively. A processor, RF unit and memory provided to an eNB shall be named an eNB processor, eNB RF unit and eNB memory, respectively.

A UE RF unit receives a reference cell information on a synchronization reference cell for a specific CC and then forwards the received reference cell information to a UE processor. The UE processor controls a UE RF unit to receive a synchronization information from the synchronization reference cell based on the reference cell information. The UE processor performs synchronization on the specific CC based on the synchronization information received from the UE RF unit.

The UE processor can perform a measurement on RRM for the specific CC based on a reference signal received from the synchronization reference cell. In this case, the reference signal received from the synchronization reference call can include at least one of CSI-RS (Channel State Information Reference Signal), CRS (Common Reference Signal) and Tracking RS (Tracking Reference Signal).

INDUSTRIAL APPLICABILITY

The embodiments of the present invention can apply to a base station, a user equipment and other equipments in a wireless communication system.

What is claimed is:

1. A method of synchronizing a new type cell in a user equipment, where the new type cell is supported by a new type user equipment and not supported by a legacy user equipment, the method comprising:
   receiving information related to a first synchronization reference cell and a second synchronization reference cell,
   wherein the first synchronization reference cell and the second synchronization reference cell are configured as a synchronization reference cell for the new type cell, and
   measuring a channel state of each of the first synchronization reference cell and the second synchronization reference cell,
   performing a synchronization of the new type cell,
   wherein the synchronization of the new type cell is performed based on a synchronization information of the synchronization reference cell having a value of the measured channel state equal to or greater than a prescribed value in the first synchronization reference cell and the second synchronization reference cell.

2. The method of claim 1, wherein the received information comprises at least one selected from the group consisting of a center frequency, a bandwidth, a cell-ID, a CSI-RS configuration, a CRS (Common Reference Signal) transmission period, a CRS transmission bandwidth, a CRS subframe location, a PSS/SSS (Primary Synchronization Signal/Secondary Synchronization Signal) transmission period, an MBSFN (Multicast broadcast single frequency network) subframe location of the synchronization reference cell for the new type cell.

3. The method of claim 1, further comprising performing a measurement for a radio resource management (RRM) of the new type cell based on a reference signal for the synchronization reference cell, wherein the reference signal for the synchronization reference cell comprises one selected from the group consisting of a CSI-RS (Channel State Information Reference Signal), a CRS (Common Reference Signal) and a tracking RS (Reference Signal).

4. In performing a synchronization of a new type cell, where the new type cell is supported by a new type user equipment and not supported by a legacy user equipment, a user equipment comprising:
   an RF (radio frequency) unit; and
   a processor configured to control the RF unit,
   wherein the processor is further configured to:
   receive information related to a first synchronization reference cell and a second synchronization reference cell,
   wherein the first synchronization reference cell and the second synchronization reference cell are configured as a synchronization reference cell for the new type cell, and
   measure a channel state of each of the first synchronization reference cell and the second synchronization reference cell,
   perform a synchronization of the new type cell,
   wherein the synchronization of the new type cell is performed based on a synchronization information of the synchronization reference cell having a value of the measured channel state equal to or greater than a prescribed value in the first synchronization reference cell and the second synchronization reference cell.

5. The user equipment of claim 4, wherein the received information comprises at least one selected from the group consisting of a center frequency, a bandwidth, a cell-ID, a CSI-RS configuration, a CRS (Common Reference Signal) transmission period, a CRS transmission bandwidth, a CRS subframe location, a PSS/SSS (Primary Synchronization Signal/Secondary Synchronization Signal) transmission period, an MB SFN (Multicast broadcast single frequency network) subframe location of the synchronization reference cell for the new type cell.

6. The user equipment of claim 4, wherein the processor further configured to perform a measurement for a radio resource management (RRM) of the prescribed cell based on a reference signal for the synchronization reference cell and wherein the reference signal for the synchronization reference cell for the new type cell comprises one selected from the group consisting of a CSI-RS (Channel State Information Reference Signal), a CRS (Common Reference Signal) and a tracking RS (Reference Signal).

* * * * *